(12) United States Patent
Jeyachandran et al.

(10) Patent No.: US 6,989,907 B1
(45) Date of Patent: Jan. 24, 2006

(54) RESPONSE APPARATUS FOR SENDING A RESPONSE IN ACCORDANCE WITH A STATE, AND A METHOD THEREFOR

(75) Inventors: Suresh Jeyachandran, Yokohama (JP);
Masayuki Takayama, Kashiwa (JP);
Aruna Rohra Suda, Yokohama (JP);
Masanori Wakai, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 08/988,959

(22) Filed: Dec. 11, 1997

(30) Foreign Application Priority Data

| Dec. 12, 1996 | (JP) | ................................. 8-332096 |
| Dec. 12, 1996 | (JP) | ................................. 8-332097 |
| Dec. 12, 1996 | (JP) | ................................. 8-332102 |
| Dec. 12, 1996 | (JP) | ................................. 8-332103 |
| Dec. 12, 1996 | (JP) | ................................. 8-332104 |

(51) Int. Cl.
*G06F 13/00* (2006.01)

(52) U.S. Cl. ..................... 358/1.15; 710/19; 379/1.01; 340/500

(58) Field of Classification Search ............... 395/110, 395/114, 113; 358/406, 438, 1.1–1.9, 1.11–1.18; 710/19; 709/200, 223, 224; 340/500; 379/1.01, 379/106.02

See application file for complete search history.

(56) References Cited

U.S. PATENT DOCUMENTS

| 3,751,582 | A | * | 8/1973 | Wernikoff et al. .......... 358/406 |
| 4,821,221 | A | * | 4/1989 | Kaneko ...................... 708/173 |
| 5,220,674 | A | * | 6/1993 | Morgan et al. ............. 395/110 |
| 5,358,238 | A | * | 10/1994 | Mandel et al. .............. 271/298 |
| 5,485,246 | A | * | 1/1996 | Hayashi et al. ................. 399/1 |
| 5,555,426 | A | | 9/1996 | Johnson et al. ........ 395/200.15 |
| 5,625,757 | A | * | 4/1997 | Kageyama et al. ......... 395/114 |
| 5,706,411 | A | * | 1/1998 | McCormick et al. ....... 395/114 |
| 5,764,892 | A | * | 6/1998 | Cain et al. ............... 395/200.3 |
| 5,852,746 | A | * | 12/1998 | Barrett ......................... 714/49 |

FOREIGN PATENT DOCUMENTS

EP 657846 A2 6/1995

\* cited by examiner

*Primary Examiner*—King Y. Poon
(74) *Attorney, Agent, or Firm*—Fitzpatrick, Cella, Harper & Scinto

(57) ABSTRACT

An error status of a printer is acquired, and based on the acquired status, transmission of a response, a content of a response, a response medium, a response addressee and a response timing are determined. When electronic mail is used as a response medium, text representing the response content that is suitable for electronic mail is prepared, and an opening sentence and a closing sentence are added before and after the text, thereby providing response information. A mail header and footer are added to the prepared response information, and the resultant information is transmitted to a host computer using electronic mail. Whether a problem has been resolved as the result of a response, or whether a response is confirmed by an addressee is determined. When a problem has not yet been resolved, or when a response has not been confirmed, a response is retransmitted using another method.

69 Claims, 46 Drawing Sheets

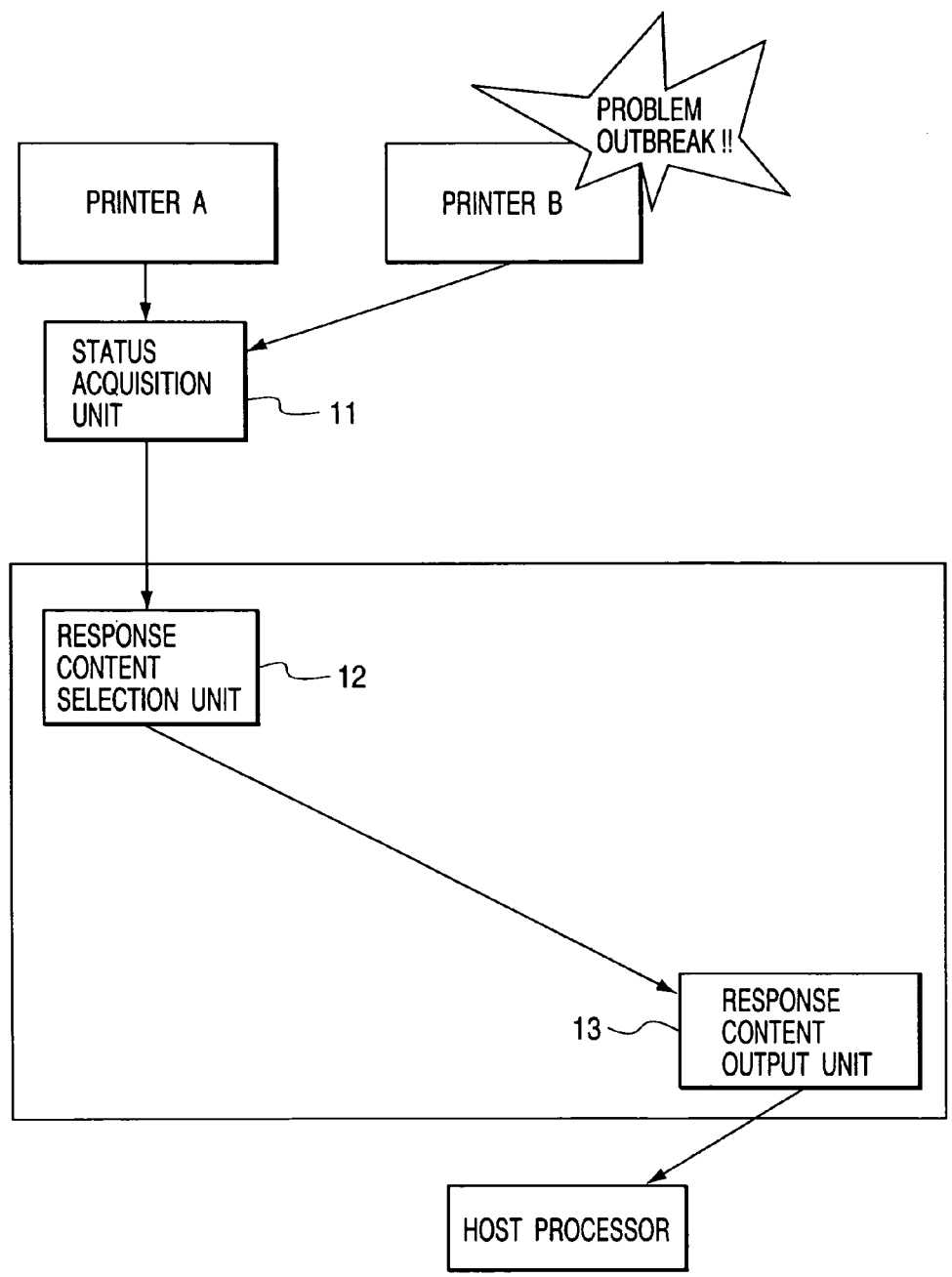

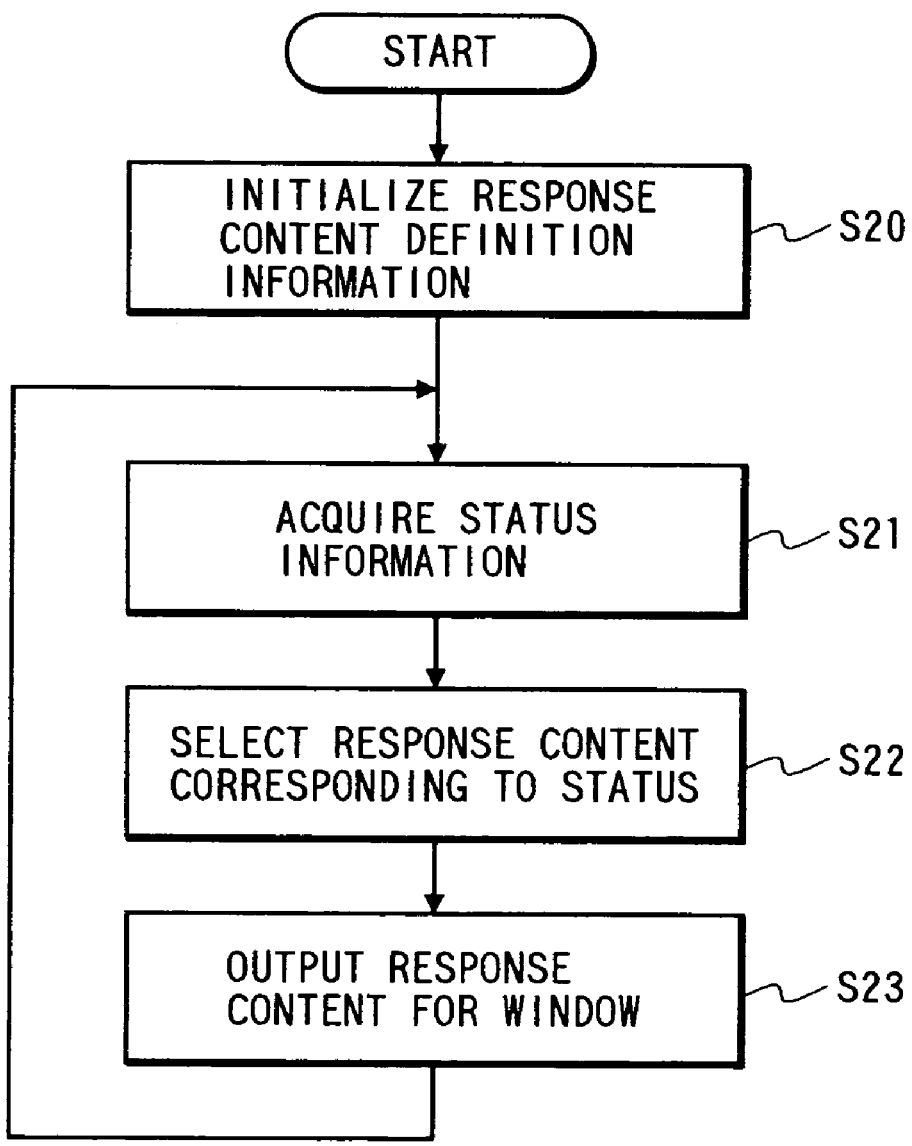

FIG. 3
PRIOR ART

| STATE | MEANING | OUTPUT CHARACTER STRING |
|---|---|---|
| 0 | CONNECTION OFF OR POWER SUPPLY OFF | POWER SUPPLY IS NOT SUPPLIED |
| 1 | PRINTING STANDBY STAGE | PRINTING POSIBLE |
| 2 | PRINTER STARTING STAGE | STARTING STAGE |
| 3 | PRINTER BUFFER ABNORMALITY | [INVALIDITY] |
| 9 | OTHER ERRORS | [INVALIDITY] |
| 10 | UPPER CARTRIDGE OUT | CARTRIDGE IS REMOVED |
| 11 | UPPER CARTRIDGE COPY PAPER OUT | COPY PAPER OUT |
| 12 | UPPER CARTRIDGE COPY PAPER REMAINING 5% | COPY PAPER RUN LOW |
| 13 | UPPER CARTRIDGE COPY PAPER REMAINING 10% | COPY PAPER RUN LOW |
| 20 | LOWER CARTRIDGE OUT | CARTRIDGE IS REMOVED |
| 21 | LOWER CARTRIDGE COPY PAPER OUT | COPY PAPER OUT |
| 22 | LOWER CARTRIDGE COPY PAPER REMAINING 5% | COPY PAPER RUN LOW |
| 23 | LOWER CARTRIDGE COPY PAPER REMAINING 10% | COPY PAPER RUN LOW |
| 30 | TONER CARTRIDGE OUT | TONER CARTRIDGE IS REMOVED |
| 31 | TONER OUT | TONER OUT |
| 32 | TONER REMAINING 5% | TONER RUN LOW |
| 33 | TONER REMAINING 10% | TONER RUN LOW |
| 41 | FIXER OUT | FIXER OUT |
| 42 | FIXER REMAINING 5% | FIXER RUN LOW |
| 43 | FIXER REMAINING 10% | FIXER RUN LOW |

FIG. 4
PRIOR ART

| PRINTER STATUS DISPLAY WINDOW |
|---|
| THERE IS NO PAPER |

FIG. 5
PRIOR ART

| STATUS | MEANING | Beep |
|---|---|---|
| 0 | RECEIVED MAIL ABSENT | OFF |
| 1 | RECEIVED MAIL PRESENT | ON |

FIG. 9

| STATE | MEANING | OUTPUT CHARACTER STRING |
|---|---|---|
| 0 | CONNECTION OFF OR POWER SUPPLY OFF | POWER SUPPLY IS NOT SUPPLIED |
| 1 | PRINTING STANDBY STAGE | PRINTING POSSIBLE |
| 2 | PRINTER STARTING STAGE | STARTING STAGE |
| 3 | PRINTER BUFFER ABNORMALITY | [INVALIDITY] |
| 9 | OTHER ERRORS | [INVALIDITY] |
| 10 | UPPER CARTRIDGE OUT | CARTRIDGE IS REMOVED |
| 11 | UPPER CARTRIDGE COPY PAPER OUT | COPY PAPER OUT |
| 12 | UPPER CARTRIDGE COPY PAPER REMAINING 5% | COPY PAPER RUN LOW |
| 13 | UPPER CARTRIDGE COPY PAPER REMAINING 10% | COPY PAPER RUN LOW |
| 20 | LOWER CARTRIDGE OUT | CARTRIDGE IS REMOVED |
| 21 | LOWER CARTRIDGE COPY PAPER OUT | COPY PAPER OUT |
| 22 | LOWER CARTRIDGE COPY PAPER REMAINING 5% | COPY PAPER RUN LOW |
| 23 | LOWER CARTRIDGE COPY PAPER REMAINING 10% | COPY PAPER RUN LOW |
| 30 | TONER CARTRIDGE OUT | TONER CARTRIDGE IS REMOVED |
| 31 | TONER OUT | TONER OUT |
| 32 | TONER REMAINING 5% | TONER RUN LOW |
| 33 | TONER REMAINING 10% | TONER RUN LOW |
| 41 | FIXER OUT | FIXER OUT |
| 42 | FIXER REMAINING 5% | FIXER RUN LOW |
| 43 | FIXER REMAINING 10% | FIXER RUN LOW |

| VARIABLE NAME | MEANING |
|---|---|
| STATE | STATUS OF PRINTER |

| VARIABLE NAME | MEANING |
|---|---|
| SENTENCE | OUTPUT CHARACTER STRING FOR RESPONSE |

FIG. 15

| KIND | CHARACTER STRING |
|---|---|
| OPENING SENTENCE | THIS IS ⌈AUTOREPLY SYSTEM⌋ FOLLOWING STATUS OCCURRED |
| CLOSING SENTENCE | ANY INQUIRY SHOULD BE DIRECTED TO MANAGER |

FIG. 16

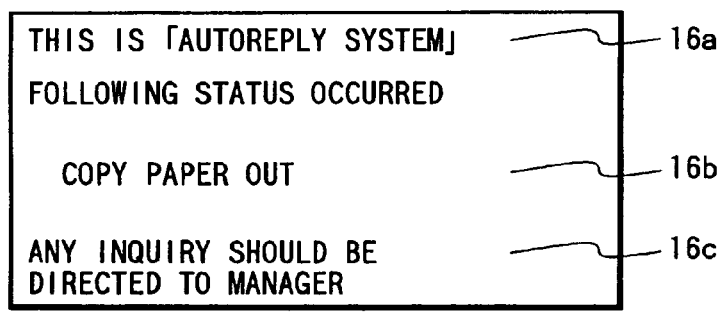

- 16a: THIS IS ⌈AUTOREPLY SYSTEM⌋ FOLLOWING STATUS OCCURRED
- 16b: COPY PAPER OUT
- 16c: ANY INQUIRY SHOULD BE DIRECTED TO MANAGER

FIG. 17

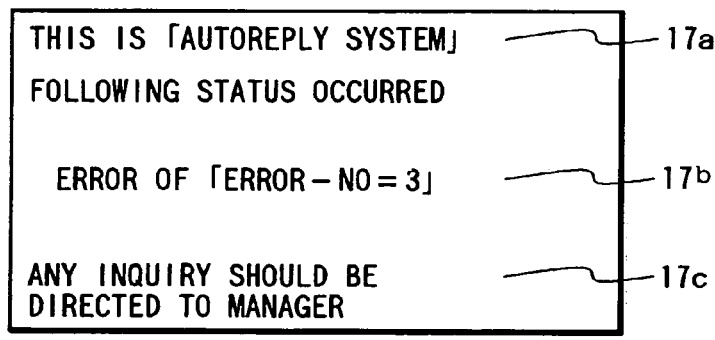

- 17a: THIS IS ⌈AUTOREPLY SYSTEM⌋ FOLLOWING STATUS OCCURRED
- 17b: ERROR OF ⌈ERROR−NO=3⌋
- 17c: ANY INQUIRY SHOULD BE DIRECTED TO MANAGER

FIG. 19

| KIND | CHARACTER STRING |
|---|---|
| MAIL HEADER SENTENCE | Subject: Printer Status<br>Date: Fri, 26 Jul 1996 17:45:15+0900<br>From: AUTOREPLY SYSTEM <autoreply@xxx.yyy.co.jp><br>To: USER <user@xxx.yyy.co.jp> |
| MAIL FOOTER SENTENCE | AUTOREPLY SYSTEM Ver 1.01<br>  MANAGER: ICHIRO KANRI<br>    tel: 03-xxxx-xxxx fax:03-yyyy-yyyy<br>    email: kanri@xxx.yyy.co.jp |

FIG. 20

```
Subject: Printer Status
Date: Fri, 26 Jul 1996 17:45:15+0900          ─── 20a
From: AUTOREPLY SYSTEM <autoreply@xxx.yyy.co.jp>
To: USER <user@xxx.yyy.co.jp>

THIS IS 「AUTOREPLY SYSTEM」
FOLLOWING STATUS OCCURRED                     ─── 20b

COPY PAPER OUT
ANY INQUIRY SHOULD BE DIRECTED TO MANAGER

AUTOREPLY SYSTEM Ver 1.01
  MANAGER: ICHIRO KANRI                       ─── 20c
    tel: 03-xxxx-xxxx fax:03-yyyy-yyyy
    email: kanri@xxx.yyy.co.jp
```

FIG. 24

| STATE | MEANING | RESPONSE | CONTENT | MEDIA | RESPONSE ADDRESSEE | TIMING | OUTPUT CHARACTER STRING |
|---|---|---|---|---|---|---|---|
| | | 9a | 9b | 9c | 9d | 9e | 9f |
| 0 | CONNECTION OFF OR POWER SUPPLY OFF | NO | ORDINARY | WINDOW | USER | INSTANT | POWER SUPPLY IS NOT SUPPLIED |
| 1 | PRINTING STANDBY STAGE | NO | ORDINARY | WINDOW | USER | INSTANT | PRINTING POSSIBLE |
| 2 | PRINTER STARTING STAGE | NO | ORDINARY | WINDOW | USER | INSTANT | STARTING STAGE |
| 3 | PRINTER BUFFER ABNORMALITY | YES | IMPORTANT | FAX | MANAGER | 5 MINUTES LATER | [INVALIDITY] |
| 9 | OTHER ERRORS | YES | URGENT | BEEPER | MANAGER | INSTANT | [INVALIDITY] |
| 10 | UPPER CARTRIDGE OUT | NO | ORDINARY | WINDOW | USER | 5 MINUTES LATER | CARTRIDGE IS REMOVED |
| 11 | UPPER CARTRIDGE COPY PAPER OUT | YES | IMPORTANT | WINDOW & BEEP | USER | INSTANT | COPY PAPER OUT |
| 12 | UPPER CARTRIDGE COPY PAPER REMAINING 5% | YES | ORDINARY | WINDOW | USER | INSTANT | COPY PAPER RUN LOW |
| 13 | UPPER CARTRIDGE COPY PAPER REMAINING 10% | YES | ORDINARY | MAIL | USER | INSTANT | COPY PAPER RUN LOW |
| 20 | LOWER CARTRIDGE OUT | NO | ORDINARY | WINDOW | USER | 5 MINUTES LATER | CARTRIDGE IS REMOVED |
| 21 | LOWER CARTRIDGE COPY PAPER OUT | YES | IMPORTANT | WINDOW & BEEP | USER | INSTANT | COPY PAPER OUT |
| 22 | LOWER CARTRIDGE COPY PAPER REMAINING 5% | YES | ORDINARY | WINDOW | USER | INSTANT | COPY PAPER RUN LOW |
| 23 | LOWER CARTRIDGE COPY PAPER REMAINING 10% | YES | ORDINARY | MAIL | USER | INSTANT | COPY PAPER RUN LOW |
| 30 | TONER CARTRIDGE OUT | NO | ORDINARY | WINDOW | ASSISTANT | 5 MINUTES LATER | TONER CARTRIDGE IS REMOVED |
| 31 | TONER OUT | YES | IMPORTANT | WINDOW & BEEP | ASSISTANT | INSTANT | TONER OUT |
| 32 | TONER REMAINING 5% | YES | ORDINARY | WINDOW | ASSISTANT | INSTANT | TONER RUN LOW |
| 33 | TONER REMAINING 10% | YES | ORDINARY | MAIL | ASSISTANT | 5 MINUTES LATER | TONER RUN LOW |
| 41 | FIXER OUT | YES | IMPORTANT | WINDOW & BEEP | ASSISTANT | INSTANT | FIXER OUT |
| 42 | FIXER REMAINING 5% | YES | IMPORTANT | WINDOW | ASSISTANT | INSTANT | FIXER RUN LOW |
| 43 | FIXER REMAINING 10% | YES | ORDINARY | WINDOW | ASSISTANT | 5 MINUTES LATER | FIXER RUN LOW |

FIG. 26

| VARIABLE NAME | MEANING |
|---|---|
| SENTENCE | RESPONSE OUTPUT CHARACTER STRING |
| EXEC | DESIGNATE WHETHER OR NOT RESPOND TO STATE |
| TIMING | DESIGNATE RESPONSE TIMING |
| CONTENTS | DESIGNATE RESPONSE CONTENT |
| MEDIA | DESIGNATE RESPONSE MEDIA |
| DIRECT | DESIGNATE RESPONSE ADDRESSEE |

FIG. 28

| KIND | CHARACTER STRING |
|---|---|
| OPENING SENTENCE | THIS IS AUTOREPLY SYSTEM |
| IMPORTANT EXPRESSION SENTENCE | THIS IS VERY IMPORTANT NOTICE PLEASE BE SURE TO ATTEND TO IT |
| URGENT EXPRESSION SENTENCE | THIS IS URGENT NOTICE PLEASE ATTEND TO IT AT ONCE |
| ASSISTANT RESPONSE SENTENCE | IN PRINTER LOCATED NEAR ENTRANCE OF ROOM |
| MANAGER RESPONSE SENTENCE | 27TH FLOOR FACING SOUTH IN PRINTER LOCATED NEAR ENTRANCE OF ROOM |
| NOTICE SENTENCE | FOLLOWING STATUS OCCURRED |
| CLOSING SENTENCE | ANY INQUIRY SHOULD BE DIRECTED TO MANAGER OR ASSISTANT |

FIG. 32

| KIND | CHARACTER STRING |
|---|---|
| MAIL HEADER SENTENCE | Subject: Printer Status<br>Date: Fri, 26 Jul 1996 17:45:15+0900<br>From: AUTOREPLY SYSTEM <autoreply@xxx.yyy.co.jp> |
| MAIL USER SENTENCE | To: USER <user@xxx.yyy.co.jp> |
| MAIL ASSISTANT SENTENCE | To: TARO JOSHU <joshu@xxx.yyy.co.jp> |
| MAIL MANAGER SENTENCE | To: ICHIRO KANRI <kanri@xxx.yyy.co.jp> |
| MAIL FOOTER SENTENCE | AUTOREPLY SYSTEM Ver 1.01<br>  MANAGER: ICHIRO KANRI<br>    tel: 03-xxxx-xxxx fax:03-yyyy-yyyy<br>    email: kanri@xxx.yyy.co.jp<br>  ASSISTANT: TARO JOSHU<br>    tel: 03-xxxx-xxxx fax:03-yyyy-yyyy<br>    email: joshu@xxx.yyy.co.jp |

FIG. 33

```
Subject: Printer Status                            ──── 20a
Date: Fri, 26 Jul 1996 17:45:15+0900
From: AUTOREPLY SYSTEM <autoreply@xxx.yyy.co.jp>
To: TARO JOSHU <joshu@xxx.yyy.co.jp>              ──── 20b THIS IS 「AUTOREPLY SYSTEM」
IN PRINTER LOCATED NEAR ENTRANCE OF ROOM           ──── 20c
FOLLOWING STATUS OCCURRED

TONER RUN LOW

ANY INQUIRY SHOULD BE DIRECTED TO
MANAGER OR ASSISTANT
─────────────────────────────────────────
AUTOREPLY SYSTEM Ver 1.01                          ──── 20d
  MANAGER: ICHIRO KANRI
    tel: 03-xxxx-xxxx  fax:03-yyyy-yyyy
    email: kanri@xxx.yyy.co.jp
  ASSISTANT: TARO JOSHU
    tel: 03-xxxx-xxxx  fax:03-yyyy-yyyy
    email: joshu@xxx.yyy.co.jp
```

FIG. 38B

RESPONSE METHOD CORRESPONDING DEFINITION DESIGNATION WINDOW

● PRINTER STATUS = 33  [TONER REMAINING 10%]

| RESPONSE | ● YES | ○ NO | |
|---|---|---|---|
| CONTENTS | ● ORDINARY | ○ IMPORTANT | ○ URGENT |
| MEDIA | ○ WINDOW | ● MAIL | ○ FAX |
| | ○ BEEPER | ○ WINDOW & BEEP | |
| RESPONSE ADDRESSEE | ○ USER | ● ASSISTANT | ○ MANAGER |
| TIMING | [ 5 ] MINUTES LATER | | |

[ OK ]   [ CANCEL ]

FIG. 39

| STATE | MEANING | 9a RESPONSE | 9b CONTENT | 9c MEDIA | 9d RESPONSE ADDRESSEE | 9e TIMING | 9f OUTPUT CHARACTER STRING |
|---|---|---|---|---|---|---|---|
| 0 | CONNECTION OFF OR POWER SUPPLY OFF | NO | ORDINARY | WINDOW | USER | INSTANT | POWER SUPPLY IS NOT SUPPLIED |
| 1 | PRINTING STANDBY STAGE | NO | ORDINARY | WINDOW | USER | INSTANT | PRINTING POSSIBLE |
| 2 | PRINTER STARTING STAGE | NO | ORDINARY | WINDOW | USER | INSTANT | STARTING STAGE |
| 3 | PRINTER BUFFER ABNORMALITY | YES | IMPORTANT | FAX | MANAGER | 5 MINUTES LATER | [INVALIDITY] |
| 9 | OTHER ERRORS | YES | URGENT | BEEPER | MANAGER | INSTANT | [INVALIDITY] |
| 10 | UPPER CARTRIDGE OUT | NO | ORDINARY | WINDOW | USER | 5 MINUTES LATER | CARTRIDGE IS REMOVED |
| 11 | UPPER CARTRIDGE COPY PAPER OUT | YES | IMPORTANT | WINDOW & BEEP | USER | INSTANT | COPY PAPER OUT |
| 12 | UPPER CARTRIDGE COPY PAPER REMAINING 5% | YES | ORDINARY | WINDOW | USER | INSTANT | COPY PAPER RUN LOW |
| 13 | UPPER CARTRIDGE COPY PAPER REMAINING 10% | YES | ORDINARY | MAIL | USER | INSTANT | COPY PAPER RUN LOW |
| 20 | LOWER CARTRIDGE OUT | NO | ORDINARY | WINDOW | USER | 5 MINUTES LATER | CARTRIDGE IS REMOVED |
| 21 | LOWER CARTRIDGE COPY PAPER OUT | YES | IMPORTANT | WINDOW & BEEP | USER | INSTANT | COPY PAPER OUT |
| 22 | LOWER CARTRIDGE COPY PAPER REMAINING 5% | YES | ORDINARY | WINDOW | USER | INSTANT | COPY PAPER RUN LOW |
| 23 | LOWER CARTRIDGE COPY PAPER REMAINING 10% | YES | ORDINARY | MAIL | USER | INSTANT | COPY PAPER RUN LOW |
| 30 | TONER CARTRIDGE OUT | NO | ORDINARY | WINDOW | ASSISTANT | 5 MINUTES LATER | TONER CARTRIDGE IS REMOVED |
| 31 | TONER OUT | YES | IMPORTANT | WINDOW & BEEP | ASSISTANT | INSTANT | TONER OUT |
| 32 | TONER REMAINING 5% | YES | ORDINARY | WINDOW | ASSISTANT | INSTANT | TONER RUN LOW |
| 33 | TONER REMAINING 10% | YES | IMPORTANT | MAIL | USER | 5 MINUTES LATER | TONER RUN LOW |
| 41 | FIXER OUT | YES | IMPORTANT | WINDOW & BEEP | ASSISTANT | INSTANT | FIXER OUT |
| 42 | FIXER REMAINING 5% | YES | IMPORTANT | MAIL | ASSISTANT | INSTANT | FIXER RUN LOW |
| 43 | FIXER REMAINING 10% | YES | ORDINARY | WINDOW | ASSISTANT | 5 MINUTES LATER | FIXER RUN LOW |

FIG. 45

| STATE | ACQUISITION VALUE MEANING | NORMAL VALUE STATE | NORMAL VALUE MEANING |
|---|---|---|---|
| 0 | CONNECTION OFF OR POWER SUPPLY OFF | 1 | PRINTING STANDBY STAGE |
| 1 | PRINTING STANDBY STAGE | 1 | PRINTING STANDBY STAGE |
| 2 | PRINTER STARTING STAGE | 1 | PRINTING STANDBY STAGE |
| 3 | PRINTER BUFFER ABNORMALITY | 1 | PRINTING STANDBY STAGE |
| 9 | OTHER ERRORS | 1 | PRINTING STANDBY STAGE |
| 10 | UPPER CARTRIDGE OUT | 1 | PRINTING STANDBY STAGE |
| 11 | UPPER CARTRIDGE COPY PAPER OUT | 1 | PRINTING STANDBY STAGE |
| 12 | UPPER CARTRIDGE COPY PAPER REMAINING 5% | 1 | PRINTING STANDBY STAGE |
| 13 | UPPER CARTRIDGE COPY PAPER REMAINING 10% | 1 | PRINTING STANDBY STAGE |
| 20 | LOWER CARTRIDGE OUT | 1 | PRINTING STANDBY STAGE |
| 21 | LOWER CARTRIDGE COPY PAPER OUT | 1 | PRINTING STANDBY STAGE |
| 22 | LOWER CARTRIDGE COPY PAPER REMAINING 5% | 1 | PRINTING STANDBY STAGE |
| 23 | LOWER CARTRIDGE COPY PAPER REMAINING 10% | 1 | PRINTING STANDBY STAGE |
| 30 | TONER CARTRIDGE OUT | 1 | PRINTING STANDBY STAGE |
| 31 | TONER OUT | 1 | PRINTING STANDBY STAGE |
| 32 | TONER REMAINING 5% | 1 | PRINTING STANDBY STAGE |
| 33 | TONER REMAINING 10% | 1 | PRINTING STANDBY STAGE |
| 41 | FIXER OUT | 1 | PRINTING STANDBY STAGE |
| 42 | FIXER REMAINING 5% | 1 | PRINTING STANDBY STAGE |
| 43 | FIXER REMAINING 10% | 1 | PRINTING STANDBY STAGE |

FIG. 47

| PREFERENTIAL RESPONSE ADDRESSEE | USEABLE MEDIA | | | |
|---|---|---|---|---|
| USER | MAIL | WINDOW | WINDOW & BEEP | |
| ASSISTANT | BEEPER | MAIL | WINDOW | WINDOW & BEEP |
| MANAGER | BEEPER | FAX | | |

FIG. 48

| PREFERENTIAL RESPONSE ADDRESSEE | USEABLE MEDIA | | | |
|---|---|---|---|---|
| USER | MAIL | WINDOW | WINDOW & BEEP | |
| ASSISTANT | BEEPER | INVALIDITY | WINDOW | WINDOW & BEEP |
| MANAGER | BEEPER | FAX | | |

RESPONSE APPARATUS FOR SENDING A RESPONSE IN ACCORDANCE WITH A STATE, AND A METHOD THEREFOR

BACKGROUND OF THE INVENTION

1. Field of the Invention

The present invention relates to a response apparatus that notifies a user or a manager of a change in the state of the apparatus and of the occurrence of an event, and a method therefor.

2. Related Background Art

FIG. 1 is a diagram illustrating an example of a conventional functional arrangement.

In FIG. 1, the statuses of system external machines, such as a printer and a facsimile machine, and the status of an apparatus itself are acquired by a status acquisition unit 11. The acquired status information is referred to by a response content selection unit 12, and a response content is selected. Then, the selected response content is output by a response content output unit 13.

As a conventional example, a response apparatus for displaying the status of a printer for a user, and a method therefor will now be described.

FIG. 2 is a flowchart showing all the processing performed by the prior art.

FIG. 3 is a diagram showing example response content definition information that is referred to in the prior art to define the meaning of each state of a printer, and an output character string transmitted as a response.

FIG. 4 is a diagram showing an example response output for the prior art.

When a system employing the conventional technique is activated, first at step S20 response content definition information is initialized to a value shown in FIG. 3. At step S21, the status acquisition unit 11 acquires a printer status indicating the status of the printer, and stores it as status information. At step S22, the response content selection unit 12 acquires an output character string associated with the stored status information by referring to the response content definition information in FIG. 3, and stores the output character string as response content information. The response content output unit 13 then displays the obtained response content information in a window in FIG. 4. Thereafter, program control returns to step S21 and the above process is repeated.

Next, a response apparatus for notifying a user of the receipt of electronic mail and a method therefor will be described as another conventional example.

FIG. 5 is a diagram showing the meanings associated with electronic mail status data, which are referred to in the prior art, and example response content definitions for state changes signaled by the production or non-production of a Beep.

The response content selection unit 12 acquires response content data that specify whether the Beep ON or the Beep OFF state corresponds to the status obtained by the status acquisition unit 11, and the response content output unit 13 actually sets the Beep ON or OFF (no processing) state.

However, in the case of an apparatus that displays printer statuses for a user, the user must actually look at a computer terminal to ascertain which status is being displayed.

Furthermore, since the momentary status of a printer is regularly displayed in a window, a user must pay the same attention to all responses, regardless of whether they are important, and may miss a very important response.

In addition, since even for a very important status notification the content of a response does not differ from that for a normal status, the importance of a response may not be readily grasped by a user. Also, since all statuses are displayed only by using a window, a user can not intuitively sense the importance of a status announcement.

On the other hand, although a special status announcement, such as "printer buffer abnormality", is difficult for a user other than a printer maintenance man, etc., to understand, such special status notifications are displayed for all users. As a result, while the import of such a status notification may not be readily grasped by an ordinary user, a printer maintenance man may discount the importance of the announcement since it is also displayed for other, ordinary users, and may neglect to perform required maintenance.

A sensor may erroneously detect "toner running low" because of the surface attitude of the toner, even though plenty of toner remains. That is, since in actuality the remaining toner is not insufficient, the toner may thereafter be gradually reduced, or the surface attitude of toner may be corrected in some way. However, conventionally, even when no correction is required, a response is output upon the detection of the abnormality, so that a user must correct the abnormality while watching the toner as it is reduced.

In addition, a window display can be annoying to a user because as all statuses are shown, statuses that are not of interest to the user are also displayed. For example, in the definitions given under "Output character strings", the column in the printer status table in FIG. 3, there is no big difference in the status expressions. The output character strings are so defined because for almost all users the importance of the statuses is not very different. For a user in charge of toner replacement, however, since to that user the statuses concerning toner are more important than any other status, the exaggeration of the responses for toner abnormalities is desirable. For a user other than a user in charge of toner replacement, statuses concerning toner need not be displayed, and no response is required.

In the case of the above apparatus for notifying a user of the receipt of electronic mail, a user does not have to watch a computer terminal, but must remain in an area within hearing range of a beeping sound generated by the computer terminal. Further, the only provided status constitutes a notification that electronic mail has been received, and when, as with printer statuses, there are a plurality of situations, such as what type of electronic mail has been received, it is difficult to describe the type of electronic mail that has been received using only a beeping sound.

As a result, a beeping sound is generated even for less important electronic mail, and the volume and the tone of the beeping sound does not differ, regardless of the importance of the electronic mail. A user must pay the same amount of attention to the receipt of all electronic mail messages, regardless of whether or not they are important, and may not realize that important electronic mail has been received.

Some systems not only notify users that electronic mail has been received, but also display in a window the subject of the correspondence. However, since the display format is the same regardless of the comparative importance of the electronic mail message, a user can not intuitively identify the important messages that are received.

Furthermore, as only an addressee is notified of the receipt of electronic mail, a person, such as a secretary, who is an agent of an addressee will not be aware that electronic mail has been received. And since a user is notified of the receipt of mail that an agent, such as a secretary, can handle, an extra load is imposed on a user.

As is described above in the prior art, since a response process suitable for the occasion is not selected, a response is output for every occasion. And since the content of responses does not change, a user may not be aware that a response is important. Furthermore, as in every case the same media is employed, a user may not be aware that a response is important, or a user who can not use the media will not receive the response. In addition, as in each case responses are provided for the same addressees, there will be users who receive unnecessary responses and users who do not receive necessary responses. Also, since for every event a response is output at the same time as the event is detected, there are more opportunities for users to receive unnecessary responses, and thus an extra load is imposed on the users.

Moreover, since the response to an obtained status is determined in advance for a system, the difference in the importance of the status to individual users can not be shown, so that a user may not be aware of an important response, and the inconvenience caused by the receipt of an unnecessary response can not be avoided.

In the case of the above apparatus for displaying the status of a printer for a user, the status of the printer is merely displayed for the user, and whether or not the user is aware of the import of the display, or whether or not the malfunction indicated by the displayed status is resolved is not taken into account. Therefore, the malfunction indicated by the status may not be resolved.

When, for example, paper runs out while reference material is being printed for use in a meeting, according to the prior art only the response "there is no paper" is displayed (FIG. 4). Since whether or not paper has actually been fed is not confirmed, in the worst case, immediately before the meeting a user may become aware that the reference material has not yet been copied.

In the case of the apparatus for notifying a user of the receipt of electronic mail, a user is merely notified that electronic mail has been received, and there is no provision for determining whether or not the user reads the electronic mail message. Thus, although the electronic mail is received, a user may not be aware that urgent mail has been received.

As is described above, in the prior art, since no consideration is given to whether or not a problem indicated by a response has been resolved, or whether or not a user confirms the response, no countermeasures can be taken when a user is not aware that an important response has been displayed.

In the prior art, since responses are issued even when users are not prepared to recognize or handle them, transmission of unwanted responses will occur and the taking of effective countermeasure will be delayed.

SUMMARY OF THE INVENTION

It is, therefore, one objective of the present invention to provide a response apparatus with which a user can receive an adequate response even when he or she does not watch a computer terminal or is not near it, and a method therefor.

It is another objective of the present invention to provide a response apparatus that attracts a user's attention to an important response, and that issues a response only to a user who requires that response and that avoids the issuance of an unnecessary response to a user, and a method therefor.

It is an additional objective of the present invention to provide a response apparatus for which individual users can freely designate response procedures, and a method therefor.

It is a further objective of the present invention to provide a response apparatus that, when a user is not aware of a response or is not prepared to handle the response, uses another method to issue a response to resolve a malfunction, and a method therefor.

It is still another objective of the present invention to provide a response apparatus that can avoid the issuance of a wasteful response when a user is not prepared to handle a response and that can take an effective countermeasure, and a method therefor.

According to one aspect, the present invention, which achieves these objectives, relates to a response apparatus comprising:

status acquisition means for acquiring a status;

response content determination means for determining a response content in accordance with the acquired status;

response information preparation means for preparing response information in accordance with the determined response content; and response information output means for outputting the prepared response information.

According to another aspect, the present invention, which achieves these objectives, relates to a response apparatus comprising:

status acquisition means for acquiring a status;

response procedure determination means for determining response procedures in accordance with the acquired status;

response information preparation means for preparing response information in accordance with the determined response procedures; and response information output means for outputting the prepared response information in accordance with the determined response procedures.

According to an additional aspect, the present invention, which achieves these objectives, relates to a response apparatus comprising:

response procedure determination means for determining response procedures in accordance with the acquired status;

response information preparation means for preparing response information in accordance with the determined response procedures;

response information output means for outputting the prepared response information in accordance with the determined response procedures;

response result determination means for determining whether or not a response has failed as a result of outputting the response information; and re-response control means for, when the response result determination means ascertains that the response has failed, permitting the response procedure determination means to determine re-response procedures, for permitting the response information preparation means to prepare re-response information in accordance with the re-response procedures, and for permitting the response information output means to output the re-response information.

According to a further aspect, the present invention, which achieves these objectives, relates to a response apparatus comprising:

response content determination means for determining a response content in accordance with the acquired status;

response information preparation means for preparing response information in accordance with the determined response content;

response information output means for outputting the prepared response information;

response addressee status acquisition means for acquiring a status for a response addressee;

determination means for employing the status at the response addressee that is acquired by the response addressee status acquisition means to determine whether or not a person at the response addressee is prepared to handle the response; and re-response control means for, when the determination means determines that the person is not prepared to handle the response, permitting the response procedure determination means to determine re-response procedures, for permitting the response information preparation means to prepare re-response information in accordance with the re-response procedures, and for permitting the response information output means to output the re-response information.

According to still another aspect, the present invention, which achieves these objectives, relates to a response method comprising the steps of:

acquiring a status;

determining a response content in accordance with the acquired status;

preparing response information in accordance with the determined response content; and outputting the prepared response information.

According to a still additional aspect, the present invention, which achieves these objectives, relates to a response method comprising the steps of:

acquiring a status;

determining response procedures in accordance with the acquired status;

preparing response information in accordance with the determined response procedures; and outputting the prepared response information in accordance with the determined response procedures.

According to a still further aspect, the present invention, which achieves these objectives, relates to a response method comprising the steps of:

determining response procedures in accordance with the acquired status;

preparing response information in accordance with the determined response procedures;

outputting the prepared response information in accordance with the determined response procedures;

determining whether or not a response has failed as a result of outputting the response information; and determining, when it is ascertained at the response result determination step that the response has failed, re-response procedures at response procedure determination means, preparing re-response information at the response information preparation step in accordance with the re-response procedures, and outputting the re-response information at the response information output step.

According to yet another aspect, the present invention, which achieves these objectives, relates to a response method comprising the steps of:

determining a response content in accordance with the acquired status;

preparing response information in accordance with the determined response content;

outputting the prepared response information;

acquiring a status at a response addressee;

employing the status at the response addressee that is acquired at the response addressee status acquisition step to determine whether or not a person at the response addressee is prepared to handle the response; and determining, when it is ascertained at the determination step that the person is not prepared to handle the response, re-response procedures at the response procedure determination step, preparing re-response information at the response information preparation step in accordance with the re-response procedures, and outputting the re-response information at the response information output step.

According to yet an additional aspect, the present invention, which achieves these objectives, relates to a computer-readable storage medium in which is stored a response program for controlling a computer to transmit a response, the program comprising codes for enabling the computer to perform the steps of:

acquiring a status;

determining a response content in accordance with the acquired status;

preparing response information in accordance with the determined response content; and outputting the prepared response information.

According to yet one further aspect, the present invention, which achieves these objectives, relates to a computer-readable storage medium in which is stored a response program for controlling a computer to transmit a response, the program comprising codes for enabling the computer to perform the steps of:

acquiring a status;

determining response procedures in accordance with the acquired status;

preparing response information in accordance with the determined response procedures; and outputting the prepared response information in accordance with the determined response procedures.

According to one more aspect, the present invention, which achieves these objectives, relates to a computer-readable storage medium in which is stored a response program for controlling a computer to transmit a response, the program comprising codes for enabling the computer to perform the steps of:

determining response procedures in accordance with the acquired status;

preparing response information in accordance with the determined response procedures;

outputting the prepared response information in accordance with the determined response procedures;

determining whether or not a response has failed as a result of outputting the response information; and determining, when it is ascertained at the response result determination step that the response has failed, re-response procedures at response procedure determination means, preparing re-response information at the response information preparation step in accordance with the re-response procedures, and outputting the re-response information at the response information output step.

According to still one more aspect, the present invention, which achieves these objectives, relates to a computer-readable storage medium in which is stored a response program for controlling a computer to transmit a response, the program comprising codes for enabling the computer to perform the steps of:

determining a response content in accordance with the acquired status;

preparing response information in accordance with the determined response content;

outputting the prepared response information;

acquiring a status at a response addressee;

employing the status at the response addressee that is acquired at the response addressee status acquisition step to determine whether or not a person at the response addressee is prepared to handle the response; and determining, when it is ascertained at the determination step that the person is not prepared to handle the response, re-response procedures at the response procedure determination step, preparing re-response information at the response information preparation step in accordance with the re-response procedures, and outputting the re-response information at the response information output step.

Objectives and advantages other than those discussed above will become apparent to those skilled in the art during the course of the description of preferred embodiments of the invention that follows. In the description, reference is made to accompanying drawings, which form a part thereof and which illustrate an example of the invention. Such example, however, is not an exhaustive recital of the various embodiments of the invention, and reference is therefore made to the claims that follow the description for a determination of the scope of the invention.

BRIEF DESCRIPTION OF THE DRAWINGS

FIG. 1 is a diagram illustrating an example functional arrangement in the prior art;

FIG. 2 is a flowchart showing an example of the overall processing performed by the prior art;

FIG. 3 is a diagram illustrating example response content definition information referred to in the prior art;

FIG. 4 is a diagram illustrating an example response output in the prior art;

FIG. 5 is a diagram illustrating meanings of individual statuses of electronic mail and example beep definitions as responses;

FIG. 9 is a diagram illustrating example response content definition information, including the meanings of the individual statuses for a printer and definitions of output character strings as responses;

FIG. 15 is a diagram showing information for response content information preparation;

FIG. 16 is a diagram illustrating example response content information when an output character string relative to an acquired status is defined;

FIG. 17 is a diagram illustrating example response content information when an output character string relative to an acquired status is not defined;

FIG. 19 is a diagram showing example information for preparation of mail response output information;

FIG. 20 is a diagram showing example response output information;

FIG. 24 is a diagram showing example response method definition information representing definitions of response methods;

FIG. 26 is a diagram showing example response method selection information that is output as the result of the processing performed by the response method selection unit according to the second embodiment;

FIG. 28 is a diagram showing information for response content information preparation;

FIG. 32 is a diagram showing example information for preparation of response output information;

FIG. 33 is a diagram illustrating example response output information;

FIGS. 38A, 38B and 38C are diagrams illustrating example windows displayed by the response method designation unit according to the third embodiment;

FIG. 39 is a diagram showing example response method definition information that is changed;

FIG. 45 is a diagram showing example information for response result evaluations consisting of definitions for status information during the normal operation related to the acquired status information;

FIG. 47 is a diagram showing example definitions for re-response method definition information in the initial states that is to be referred to or updated in the response method selection process according to the fourth embodiment;

FIG. 48 is a diagram showing the updated re-response method definition information that is to be referred to or updated in the response method selection process according to the fourth embodiment;

DETAILED DESCRIPTION OF THE PREFERRED EMBODIMENTS

The preferred embodiments of the present invention will now be described in detail while referring to the accompanying drawings.

First Embodiment

Operating features of a first embodiment are the acquisition of the status of a printer, the preparation of response content information having a form suitable for electronic mail, and the transmission of the printer status by electronic mail. Another operating feature is the employment of data for the preparation of response content information when preparing response content information that consists of an opening sentence, text and a closing sentence. An additional operating feature is the employment of data for the output of response content to output response information consisting of a mail header, mail text and a mail footer.

<Example Arrangement of System>

Figure 6:
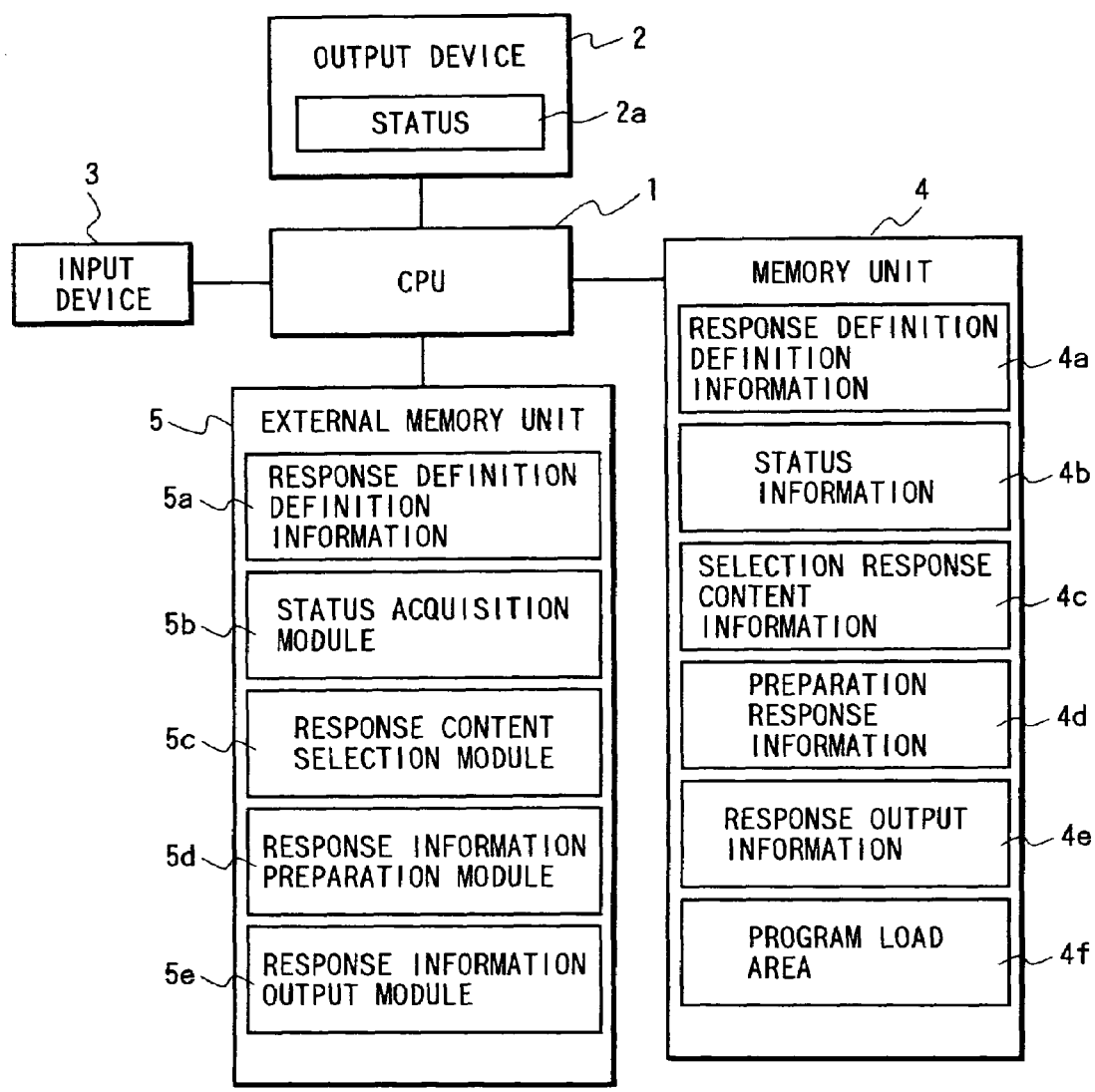
FIG. 6 is a block diagram illustrating an example hardware arrangement for an information processing system according to a first embodiment of the present invention.

FIG. 6 is a block diagram illustrating an example hardware arrangement for an information processing system according to the first embodiment.

The information processing system comprises a central processing unit (hereinafter referred to as a CPU) 1 and units connected to the central processing unit 1. The CPU 1 controls the individual units and executes various programs. An output device 2 outputs processing results obtained by the information processing system, and is, for example, a display or a printer. The output device 2 has a status 2a that represents its individual status. This status is acquired and referred to by the information processing system.

An input device 3 is used to input an operating instruction, and is, for example, a keyboard or a pointing device. A memory unit 4 is constituted by a ROM or a RAM in which are stored data for the processing steps in this embodiment (control procedures for the CPU 1). The data stored in the memory unit 4 are read and processed by the CPU 1.

The memory unit 4 includes a response content definition information memory area 4a, in which are stored definitions of response contents relative to statuses; a status information memory area 4b, in which is stored such status information as the status 2a that is acquired for the output device 2; a response content selection information memory area 4c, in which is stored a selected response content; a response content information memory area 4d, in which is stored response content information that has been prepared; a response output information memory area 4e, in which is stored response output information that is to be output; and a program load area 4f, into which a program from an external memory unit 5 is loaded.

The external memory unit 5 can be a hard disk on which is stored a large quantity of information, such as a dictionary; or a portable memory medium, such as a floppy disk. The external memory unit 5 includes a response content definition information memory area 5a, in which are stored definitions of response contents related to the statuses; and a status acquisition module 5b, a response content selection module 5c, a response information preparation module 5d and a response information output module 5e that respectively implement the functions of a status acquisition unit 71, a response content selection unit 72, a response information preparation unit 73 and a response information output unit 74, all of which will be described later.

<Processing Configuration>

Figure 7:
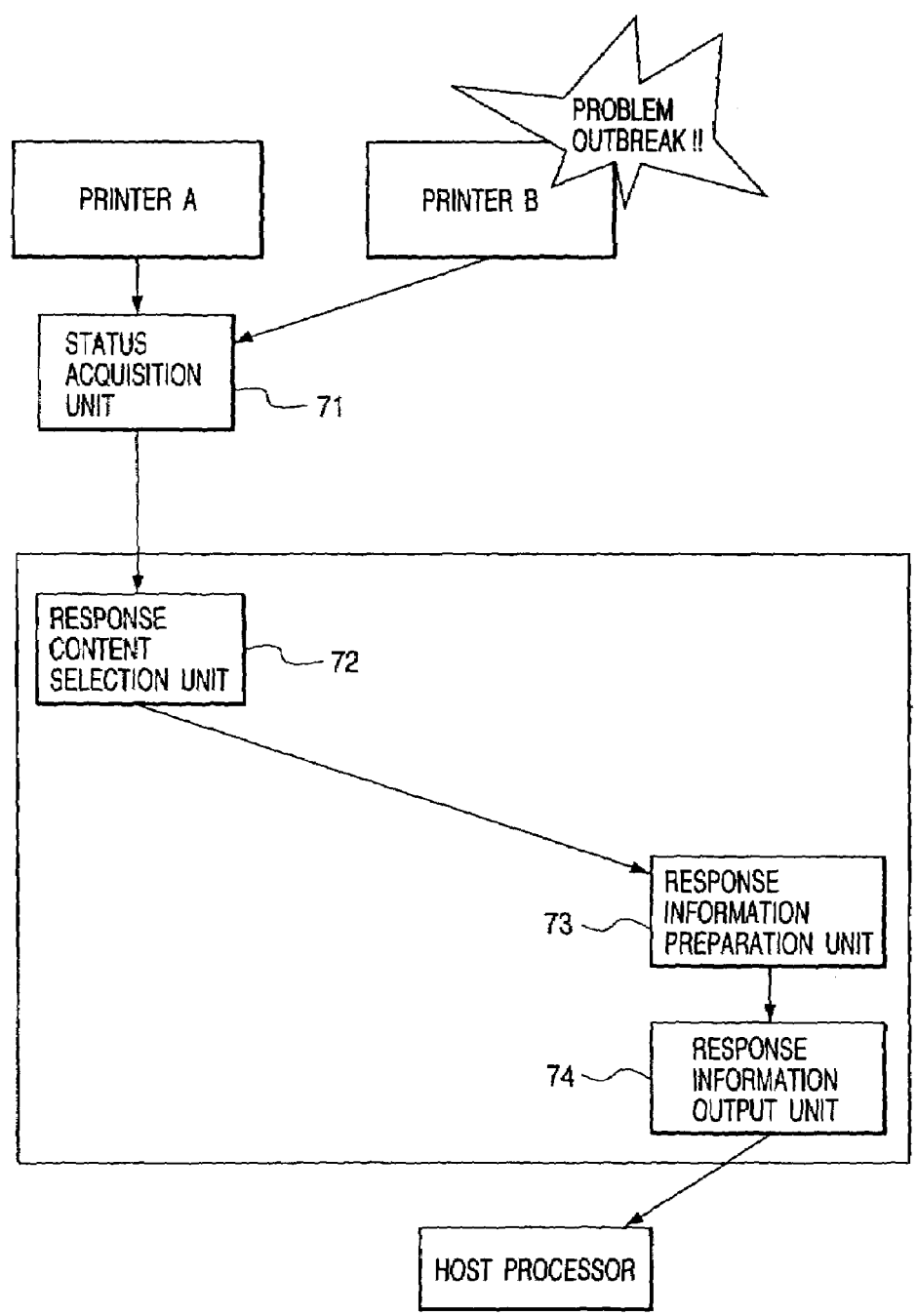
FIG. 7 is a diagram illustrating an example processing structure according to the first embodiment.

FIG. 7 is a diagram illustrating an example processing configuration in the first embodiment.

The status acquisition unit 71 acquires the status of an external machine, such as a printer or a facsimile machine, and the status of the system. The response content selection unit 72 refers to the acquired status information and selects the response contents. Then, in consonance with the selected response contents, the response content preparation unit 73 prepares response information using an appropriate expression method. The response information output unit 74 outputs the prepared response information to an addressee.

The individual units in FIG. 7 will now be described in detail.

Figure 8:
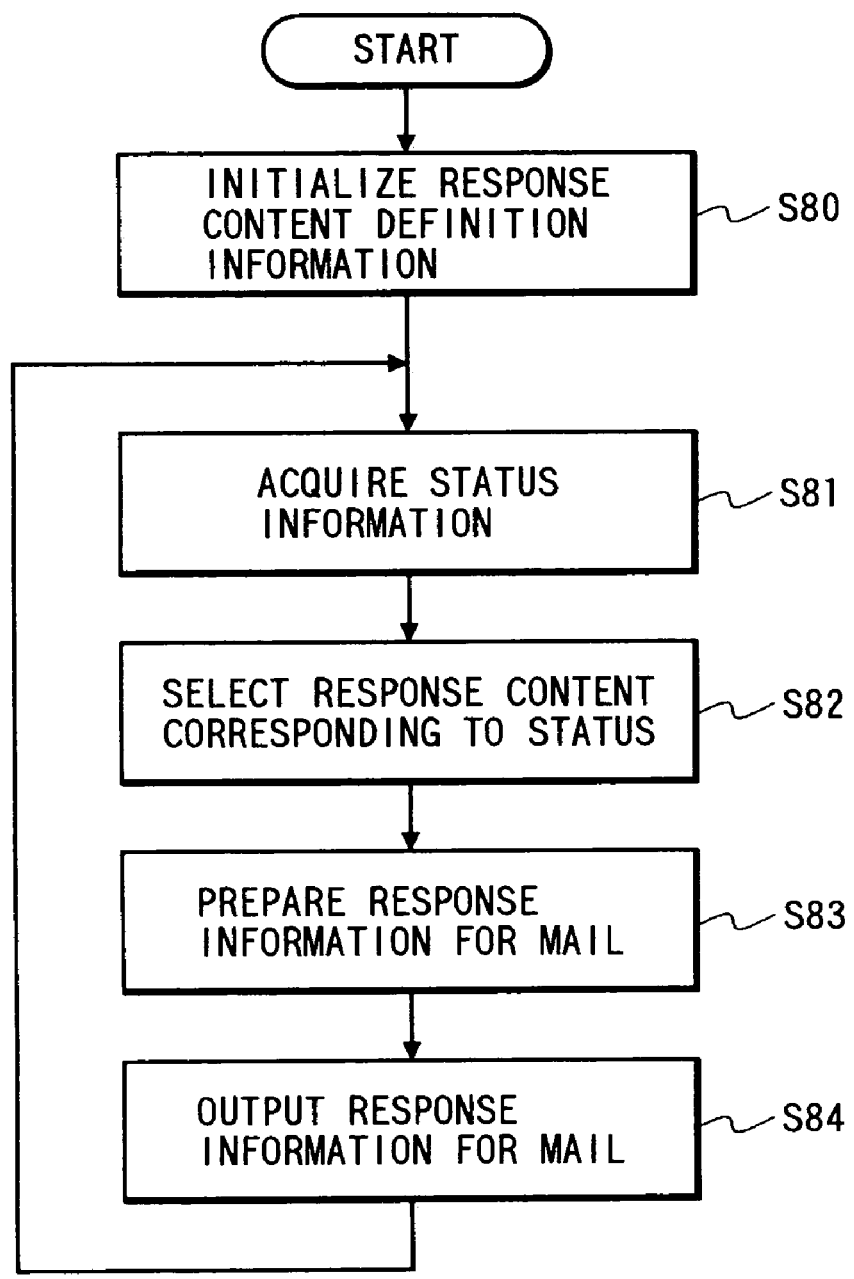
FIG. 8 is a flowchart showing an example of the overall processing according to the first embodiment.

FIG. 8 is a flowchart for the overall processing performed in the first embodiment.

FIG. 9 is a diagram showing response content definition information that represents the meanings of the individual statuses of a printer and the definitions of character strings output as responses.

When the system in the first embodiment is activated, at step S80 the response content definition information is initialized to values shown in FIG. 9. Then, at step S81 the status acquisition unit 71 acquires the printer status indicating the status of a printer, and stores it in the status information memory area 4b. At step S82 the response content selection unit 72 refers to the response method definition information in FIG. 9 and selects an output character string related to the status stored in the status information memory area 4b, and stores the output character string in the response content selection information memory area 4c. At step S83, in consonance with the response content selection information, the response information preparation unit 73 prepares response content information using an expression method that is suitable for electronic mail, and stores the response content information in the response content information memory area 4d. The response content output unit 74 outputs the obtained response content information by electronic mail. Program control returns to step S81 and the above process is repeated.

<Status Acquisition Unit 71>

Figures 10, 11:
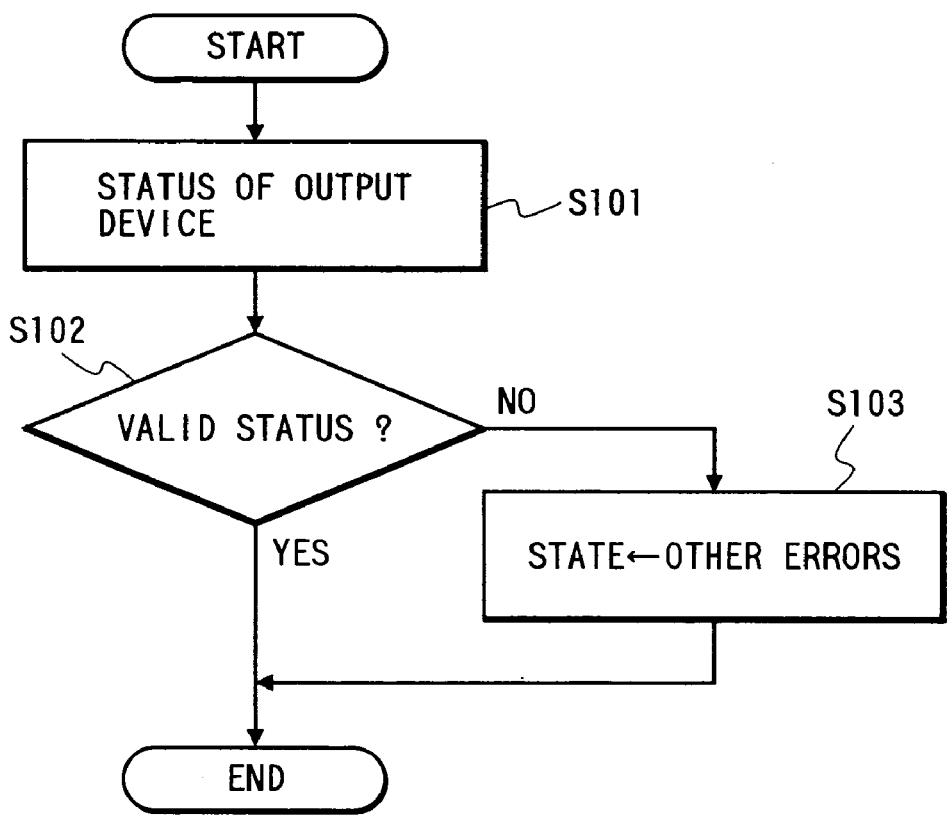
FIG. 10 is a flowchart showing the entire processing performed by a status acquisition unit according to the first embodiment.
FIG. 11 is a diagram showing example status information.

FIG. 10 is a flowchart for the processing performed by the status acquisition unit 71 in the first embodiment.

FIG. 11 is a diagram showing example status information that is output as the result of the processing by the status acquisition unit 71 in the first embodiment.

When the status acquisition unit 71 is activated, at step S101 status 2a of the output device 2 is stored in a variable "state." At step S102 a check is performed to determine whether or not the variable "state" is a valid status defined in FIG. 9. When the variable "state" is a valid status, the variable "state" is returned as status information, and the processing is thereafter terminated. If the variable "state" is not a valid status, program control moves to step S103, whereat the status "other errors" is stored in the variable "state." The variable "state" is returned as status information and the processing is thereafter terminated.

If the status 2a at the output device 2 is the status "upper cartridge copy paper out"=11, this is a valid status defined in FIG. 9. Therefore, status=11 is returned as status information, and the processing is terminated. When the status 2a is "invalidity"=99, program control goes to step S103, whereat the status "other errors"=9 is stored. Then, status =9 is returned as status information, and the processing is terminated.

<Response Content Selection Unit 72>

Figures 12, 13:
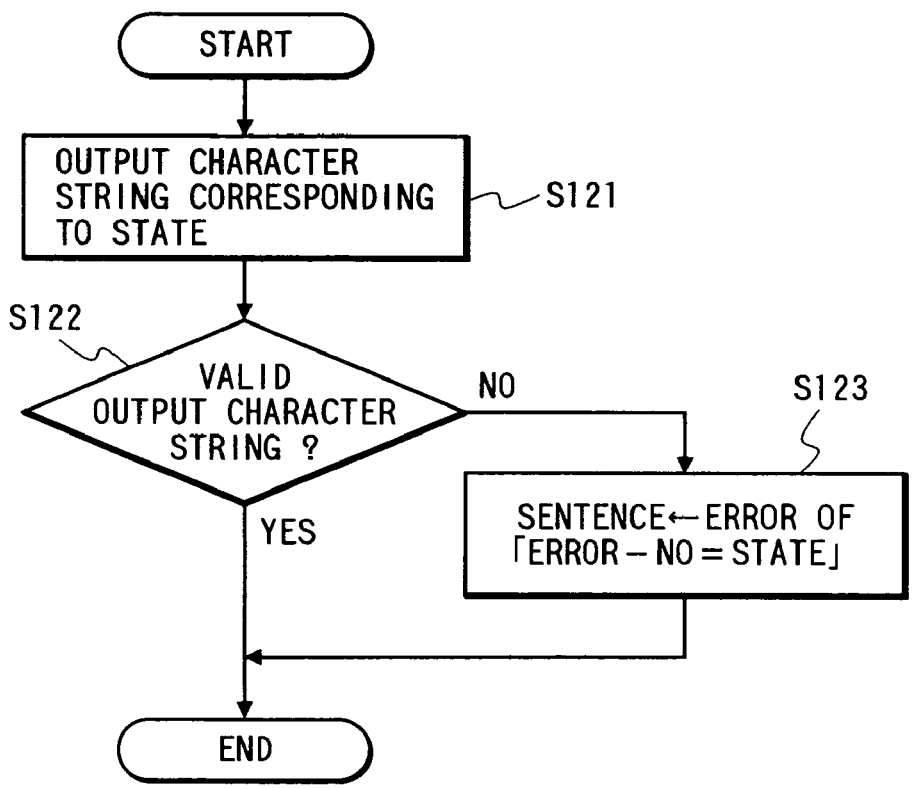
FIG. 12 is a flowchart of the overall processing performed by a response content selection unit according to the first embodiment.
FIG. 13 is a diagram showing response method limitation information.

FIG. 12 is a flowchart for the processing performed by the response content selection unit 72 in the first embodiment.

FIG. 13 is a diagram showing example response method limitation information that is output as the result of processing by the response content selection unit 72 in the first embodiment.

When the response content selection unit 72 is activated, at step S121 an output character string, which corresponds to the variable "state" for status information acquired by the status acquisition unit 71, is stored in the variable "sentence", by referring to the response method definition information 4a in FIG. 9. At step S122, a check is performed to determine whether or not the character string stored in the variable "sentence" is valid. If the character string is valid, program control moves to step S123, whereat the content in the variable "state" is rewritten, and the variable "sentence" is returned as response content selection information. The processing is thereafter terminated.

When, for example, the variable "state" for status information acquired by the status acquisition unit 71 is status "upper cartridge copy paper out"=11, this status is a valid output character string defined in FIG. 9. Thus, the corresponding output character string "copy paper out" is stored in the variable "state" as the response content selection information (16b in FIG. 16, which will be described later). However, when the variable "state" for status information is status "printer buffer abnormality"=3, an output character string is invalid. Thus, "state" in character string "error No.=state" is replaced by the actual variable "state", and character string "error No.=3" is stored in the variable "sentence" as response method limitation information (17b in FIG. 17, which will be described later).

<Response Information Preparation Unit 73>

Figure 14:
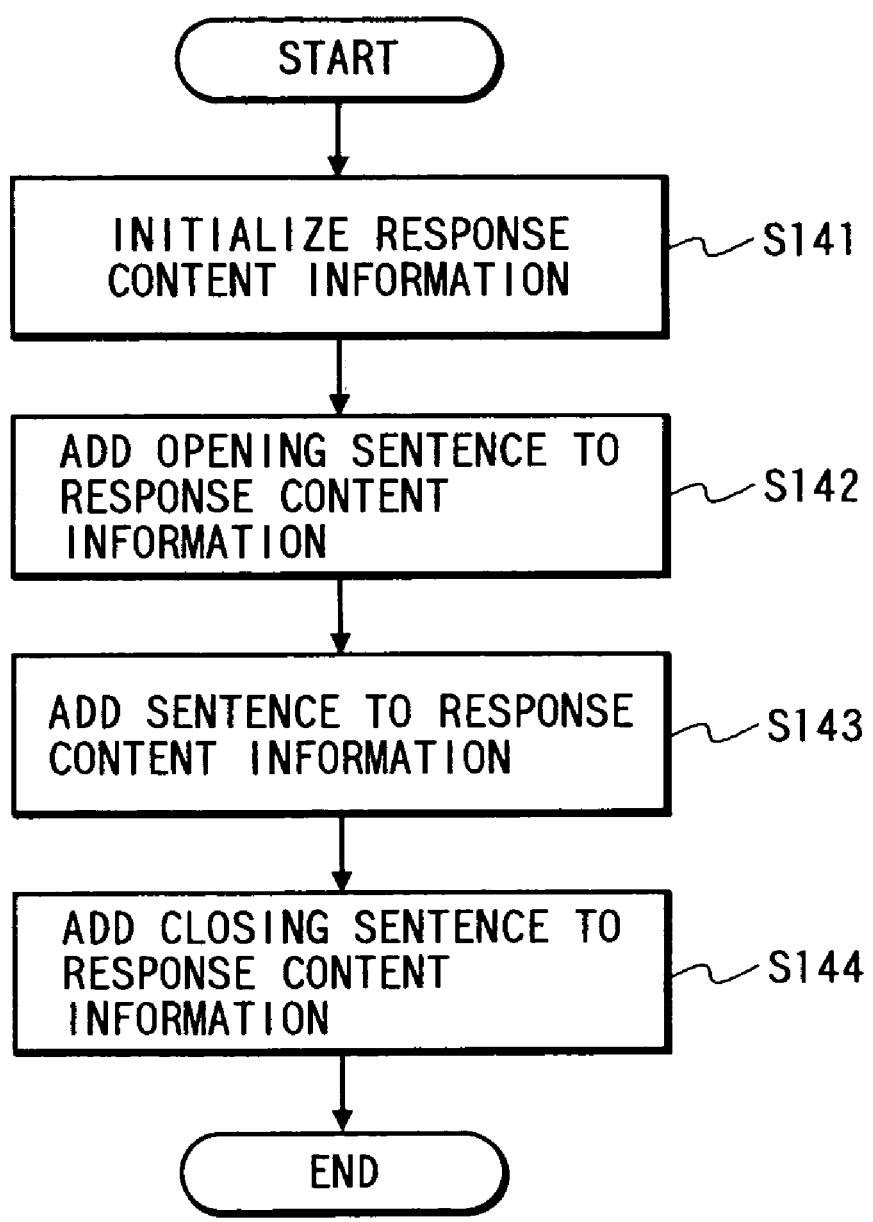
FIG. 14 is a flowchart of the overall processing performed by a response information preparation unit according to the first embodiment.

FIG. 14 is a flowchart for the processing performed by the response information preparation unit 73 in the first embodiment.

FIG. 15 is a diagram showing information for the preparation of response content information that is referred to by the response information preparation unit 73 in the first embodiment. As information for the preparation of response content information, character strings corresponding to an "opening sentence" and a "closing sentence" are defined.

FIGS. 16 and 17 are diagrams illustrating example response content information that is prepared by the response information preparation unit 73 in the first embodiment. In FIG. 16 is an example obtained when an output character string corresponding to an acquired status is defined, and in FIG. 17 is an example obtained when an output character string corresponding to an acquired status is not defined.

When the response information preparation unit 73 is activated, at step S141 response content information is initialized as a blank output character string. At step S142 a character string (16a in FIG. 16 or 17a in FIG. 17) corresponding to an "opening sentence" is added to the response content information by referring to the information for the preparation of response content information in FIG. 15.

Following this, at step S143 information (16b in FIG. 16 or 17b in FIG. 17) in a variable "sentence" for response content selection information, which is stored by the response content selection unit 72, is added to the response content information.

Finally, at step S144 a character string (16c in FIG. 16 or 17c in FIG. 17) corresponding to a "closing sentence" is added to the response content information by referring to the information for preparation of response content information in FIG. 15. The resultant response content information is returned and the processing is thereafter terminated.

<Response Information Output Unit 74>

Figure 18:
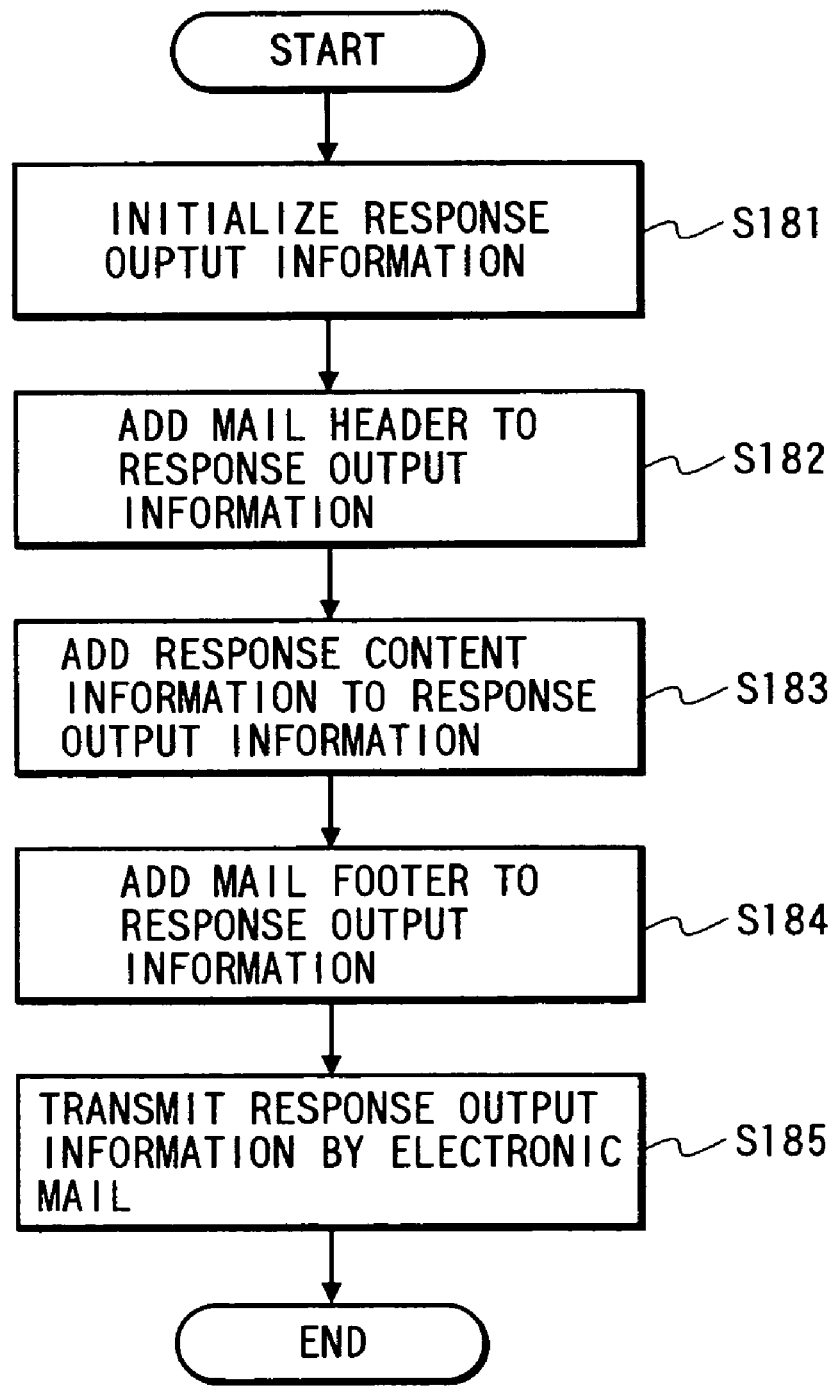
FIG. 18 is a flowchart of the overall processing performed by a response information output unit according to the first embodiment.

FIG. 18 is a flowchart for the processing performed by the response information output unit 74 in the first embodiment.

FIG. 19 is a diagram showing information for the preparation of mail response output information that is referred to by the response information output unit 74 in the first embodiment. As information for the preparation of response output information, character strings corresponding to a "Mail header" and a "Mail footer" are defined.

FIG. 20 is a diagram illustrating example response output information that is prepared and output by the response information output unit 74 in the first embodiment.

When the response information output unit 74 is activated, at step S181 response output information is initialized as a blank character string. At step S182 a character string (20a in FIG. 20) corresponding to "Mail header" is added to the response output information by referring to the information for the preparation of response output information in FIG. 19.

Then, at step S183 response content information (20b in FIG. 20), which is returned from the response content preparation unit 73, is added to the response output information. At step S184 a character string (20c in FIG. 20) corresponding to "Mail footer" is added to the response output information by referring to the information for the preparation of response output information in FIG. 19.

At step S185 the response output information prepared by employing the above procedures is transmitted by electronic mail to an addressee.

[Modification of First Embodiment]

Although a response related to a single status is explained in the first embodiment, a plurality of error statuses that occur at the same time may be acquired, and response information may be prepared and output.

When, for example, a plurality of errors, such as the lack of toner and paper, occur, or when errors occur simultaneously at a plurality of devices, such as the printers A and B in FIG. 7, for output, the types of errors may be included in a single item of response information.

To prepare response information, a response content preparation rule may be employed. As a result, expressive response information can be prepared.

The electronic mail employed in the first embodiment can be replaced by a telephone as the medium employed for responding, and response information may be prepared in a form suitable for transmission over the telephone and then may be output by telephone. To do this, information included in response information in the first embodiment need only be prepared as voice information. The mail header in the first embodiment may be replaced by a phase, such as "Hello", which is an appropriate telephone response.

In this case, since an addressee is a telephone, when an error occurs, a response can be transmitted immediately. Further, response information can be transmitted without requiring an addressee to aggressively perform an operation. In addition, when a portable telephone is used as the telephone for an addressee, a correct response can immediately be transmitted to an addressee.

In the first embodiment, a management system can be regarded as a response addressee, and response information can be prepared in a form suitable for the management system and transmitted thereafter to the management system. A database system or a file management system can be employed as such a management system.

In addition, in the first embodiment, an addressee may be a home page, and response information may be prepared in a form suitable for the home page and be posted on the home page. Thus, an unspecified majority of people can obtain information concerning the status, such as the occurrence of an error.

Furthermore, in the first embodiment, response information may be prepared in a form suitable for sound, and may be output by sound. To do this, each item of information included in the response information in the first embodiment may be prepared as voice information, or voice synthesization may be performed for response information that is prepared as a character string.

Further, in the first embodiment, a pocket bell (pager) may be regarded as an addressee, and response information may be prepared in a form suitable for the pager, and thereafter may be transmitted to the pager. To do this, response information need only be prepared by using character types and a character count to enable transmission to the pager. Additional response information may be acquired by making a call after response information has been received by the pager.

Moreover, in the first embodiment, a facsimile machine may be determined as an addressee, and response information may be prepared in a form suitable for a facsimile machine and be transmitted by facsimile. In this case, it is best that a facsimile invoice to be added before the response information.

According to the above described embodiment, even when a user does not watch a computer monitor or is not nearby, the user can expeditiously receive a response.

Second Embodiment

Operating features of a second embodiment are referring to status-response method corresponding data, the determination in consonance with an acquired printer status as to whether a response should be output, the selection of response contents, the selection of a response medium, the selection of a response addressee, and the selection of a response timing.

<Example Arrangement of System>

Figure 21:
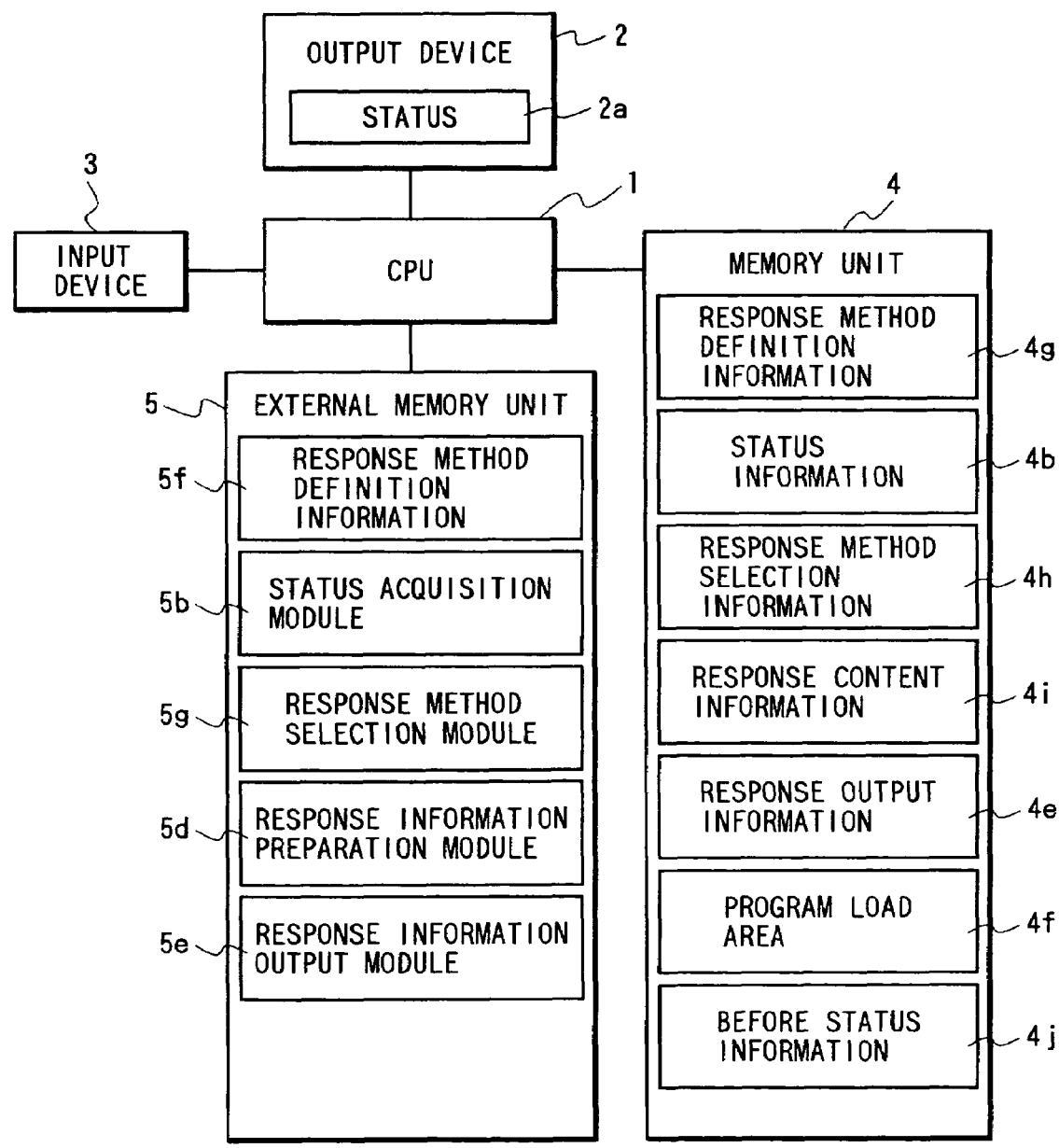
FIG. 21 is a block diagram illustrating an example hardware arrangement for an information processing system according to a second embodiment of the present invention.

FIG. 21 is a block diagram illustrating example hardware arrangement for an information processing system according to the second embodiment. The structure in FIG. 21 is substantially the same as that in FIG. 6, except that a part of the contents differ that are stored in the external unit 4 and an external memory unit 5. Thus, only portions that are not shown in FIG. 6 will be explained.

In the memory unit 4, a response method definition information memory area 4g is used to store definitions for response methods related to statuses, and a response method selection information memory area 4h is used to store a selected response method. A response content information memory area 4i is used to store response content information that has been prepared, and a previous status information memory area 4j is used to store status information that was previously acquired.

In the external memory unit 5, a response method definition information memory area 5f is used to store definitions for response methods related to statuses, and a response method selection module 5g includes a program for implementing the function of a response method selection unit 75, which will be described later.

<Processing Configuration>

Figure 22:
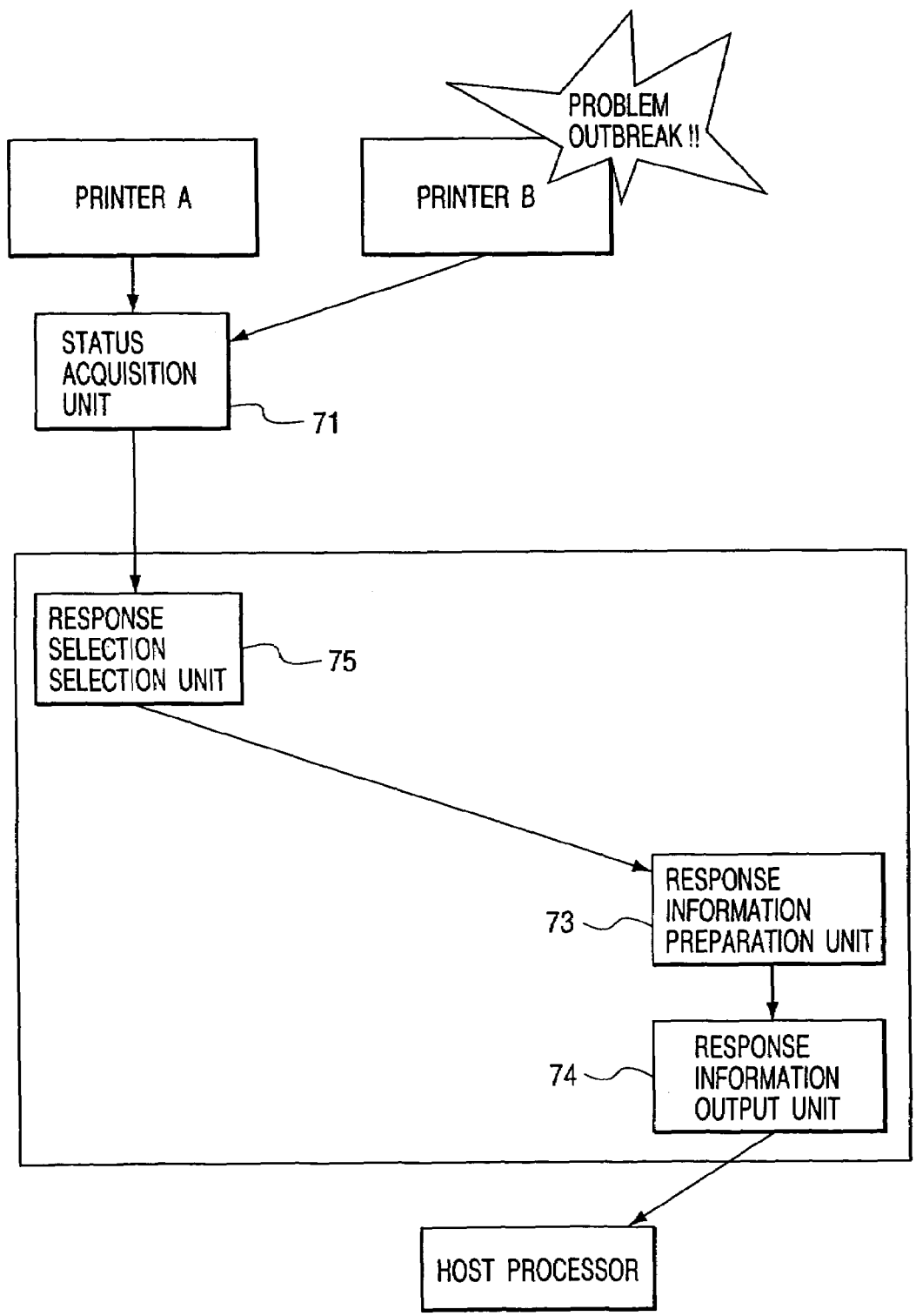
FIG. 22 is a diagram of an example processing structure according to the second embodiment.

FIG. 22 is a diagram of an example processing configuration according to the second embodiment. Essentially, only that portion that differs from the example in FIG. 7 will be described.

When the status of an external machine, such as a printer or a facsimile machine, or the status of the system is acquired by a status acquisition unit 71, a response method selection unit 72 refers to the acquired status information and selects a response method. Then, in consonance with the selected response method, a response information preparation unit 73 prepares response information using a satisfactory expression method. A response information output unit 74 outputs prepared response information to an addressee using the selected response method.

The individual units in FIG. 22 will now be described in detail.

Figure 23:
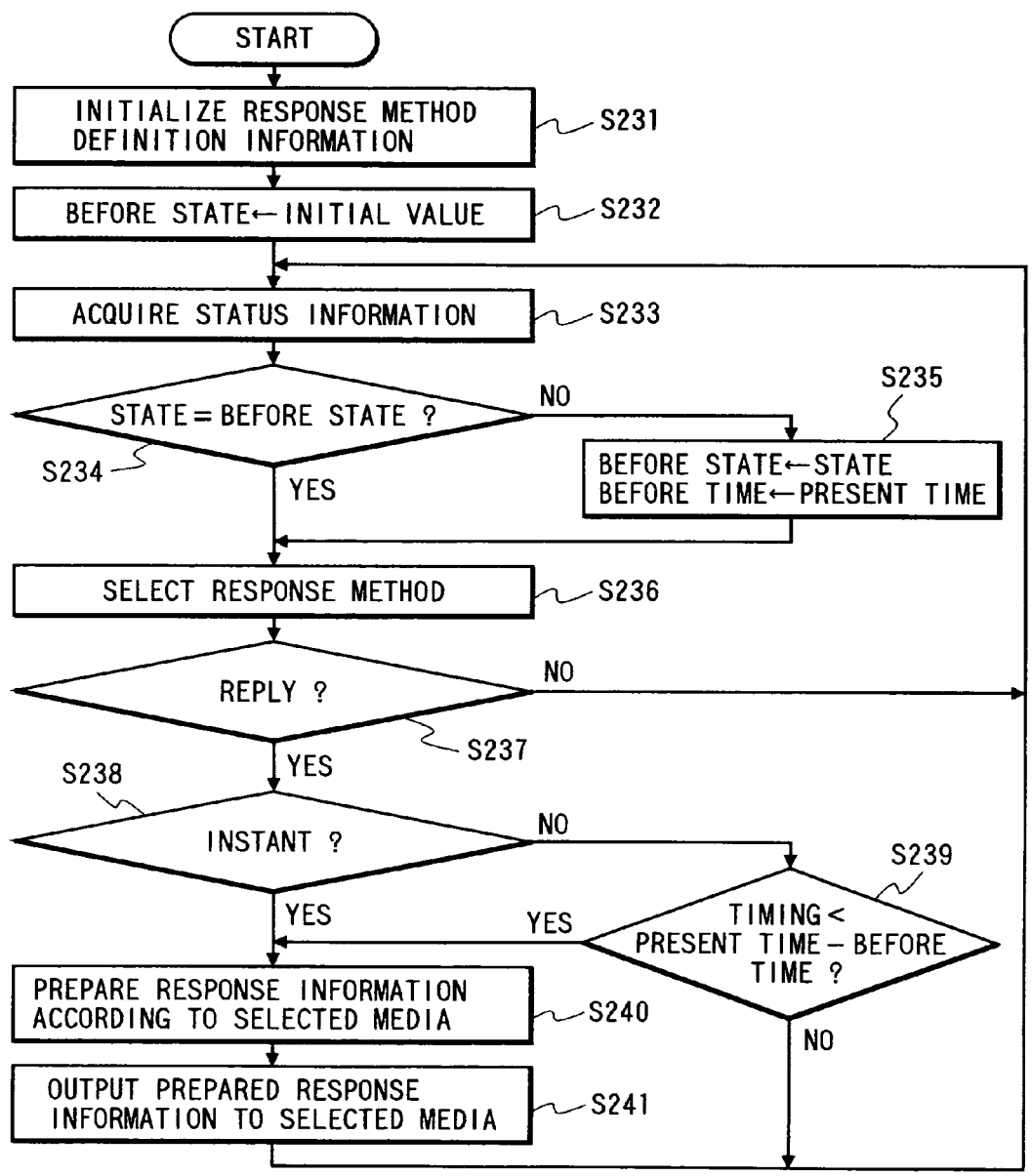
FIG. 23 is a flowchart of an example of the overall processing performed by the second embodiment.

FIG. 23 is a flowchart of the overall processing for the second embodiment.

FIG. 24 is a diagram showing example response method definition information including meanings of the statuses of a printer and definitions of response methods, such as the presence of a response, the contents of a response, a response medium, a response addressee, a response timing and a character string to be output.

When the system in this embodiment is activated, at step S231 the response method definition information is initialized to the values shown in FIG. 24, and at step S232 the variable "BeforeState" is initialized as a value (e.g., −1) that it is impossible for the status acquisition unit 71 to acquire.

At step S233, the status acquisition unit 71 acquires a printer status indicating the status of a printer, and stores it in a status information memory area 4b. At step S234 the variable "state" for the status information is compared with the variable "BeforeState". When the two variables differ, program control moves to step S235. The variable "state" is stored in the variable "BeforeState", and the current time is stored in the variable "BeforeTime". Program control then moves to step S236. When the two variables match, program control goes from step S234 directly to step S236.

At step S236 the response method selection unit 75 acquires a response method corresponding to the status stored in the status information memory area 4b by referring to the response method definition information in FIG. 24, and stores the acquired response method in the response method selection information memory area 4h. At step S237 a check is performed to determine whether or not a reply to the response method selection information is specified. When a reply is not specified, no further processing is performed and program control returns to step S233. At step S238, a response timing for the response method selection information is examined. When a designated response timing is not instant timing, program control goes to step S239. If a period of time that has elapsed up to the present following the time stored in the variable "BeforeTime" is not greater than the response time that is designated, no further processing is performed and program control returns to step S233. When, at step S238, the designated time is instant timing and when, at step S239, the elapsed time is greater than the designated response time, program control advances to step S240.

At step 240, in consonance with the response method selection information, the response information preparation unit 73 prepares response information using an expression method suitable for the selected medium, and stores the response information in the response content information memory area 4d. At step S241 the response information output unit 74 outputs the prepared response information to the selected media. Program control then returns to step S233, and the processing is repeated.

An explanation will be given for when, at step S233, status "upper cartridge copy paper out"=11 is acquired. As was previously described, various data used in this embodiment are initialized when the system is activated.

Since the currently obtained status and a value stored in the variable "BeforeState" always differ, at step S234 it is ascertained that state≠BeforeState, program control moves to step S235, whereat status "upper cartridge copy paper out" status=11 is stored in the variable "BeforeState", and the current time (e.g., 9:30) is stored in BeforeTime. Then, at step S236 a response method corresponding to status=11 in FIG. 9 is acquired. Since a reply to the response method is specified and the response timing is designated "instant", program control moves to step S240. At step S240, Window & Beep is designated as a response medium, and Window & Beep response information is prepared. At step S241 Window & Beep response information is output, and program control thereafter returns to step S233.

An explanation will now be given for when, at step S233, status "upper cartridge OUT"=10 is acquired. Assuming that status=11 is stored in the variable "BeforeState", at step S234 it is ascertained that state≠BeforeState, and program control moves to step S235. At step S235, status "upper cartridge OUT"=10 is stored in the variable "BeforeState", and the current time (e.g., 9:45) is stored in BeforeTime. When, at step S236, a response method corresponding to status=10 in FIG. 9 is acquired, a reply to the response method is not designated, no further processing is performed and program control returns to step S233.

An explanation will be given when, at step S233, status "toner remaining 10%"=33 is acquired. Assuming that status=10 is stored in the variable "BeforeState", at step S234 it is ascertained that state≠BeforeState, and program control moves to step S235. At step S235 status "tone remaining 10%"=33 is stored in BeforeState, and the current time (e.g., 10:00) is stored in BeforeTime.

Following this, when, at step S236, a response method corresponding to status=33 in FIG. 24 is acquired, a reply is designated and a response timing is designated as "five minutes later". Program therefore moves to step S239. At step S239 the time stored in the variable "BeforeTime" is subtracted from the current time to acquire the period of time that has elapsed since status "toner remaining 10%"=33. The elapsed time is compared with the designated response timing. Since at this time the elapsed time is shorter than the designated time, no further processing is performed and program control returns to step S233.

An explanation will now be given for when, ten minutes after the above case, status "toner remaining 10%"=33 is acquired at step S233. Since status=33 is stored in the variable "BeforeState", at step S234 it is ascertained that state=BeforeState, and program control moves to step S236. When, at step S236, a response method corresponding to status=33 in FIG. 24 is acquired, a reply to the response method is designated and a response timing is designated as "five "minutes later". Program control thereafter goes to step S239. At step S239 the current time (10:10) is compared with the time (10:00) stored in the variable "BeforeTime". Since the current time exceeds the designated response timing "five minutes later", program control advances to step S240. In addition, since mail is designated as a response medium, mail response information is prepared and is output at step S241. Program control thereafter returns to step S233.

<Status Acquisition Unit 71>

FIG. 10 is a flowchart for processing performed by the status acquisition unit 71 in the second embodiment. The processing is the same as that in the first embodiment, except that the response method definition information in FIG. 24 is referred to, instead of the response content definition information in FIG. 9, and as a result of the processing, the status information in FIG. 11 is output as in the first embodiment. Therefore, no detailed explanation for them will be given.

<Response Method Selection Unit 75>

Figure 25:
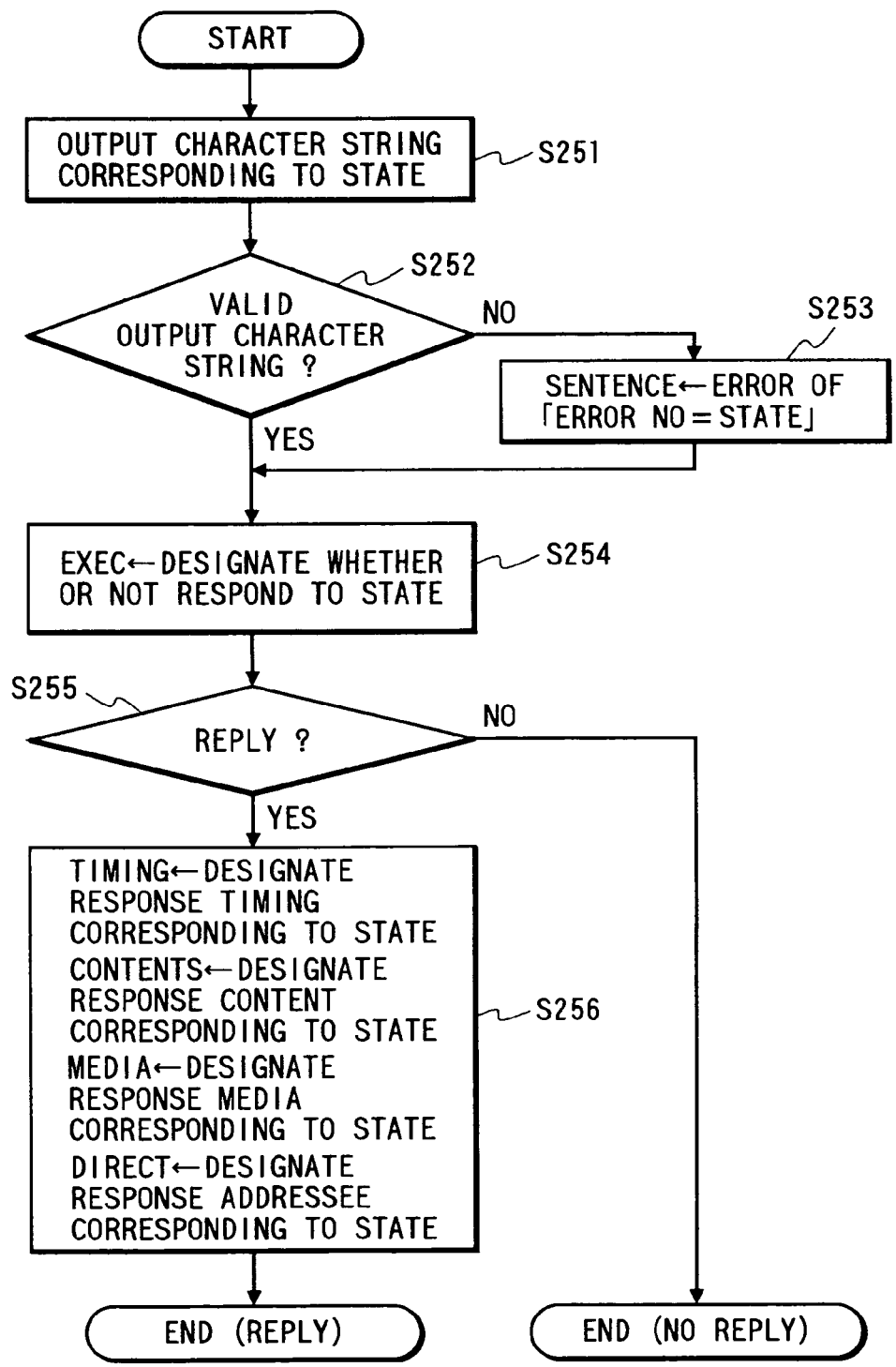
FIG. 25 is a flowchart of the overall processing performed by a response method selection unit according to the second embodiment.

FIG. 25 is a flowchart for the processing performed by the response method selection unit in the second embodiment.

FIG. 26 is a diagram showing example response method selection information that is output as the result of the processing by the response method selection unit 75 in the second embodiment.

When the response method selection unit 75 is activated, at step S251 an output character string, which corresponds to the variable "state" for status information acquired by the status acquisition unit 71, is stored in the variable "sentence" by referring to the response method definition information in FIG. 24. At step S252 a check is performed to determine whether or not the character string stored in the variable "sentence" is valid. When the character string is invalid, program control moves to step S253, and the contents of the variable "sentence" are rewritten.

At step S254 whether or not to reply to variable "state" for the status information acquired by the status acquisition unit 71 is designated, and the results are stored in the variable "exec" by referring to the response method definition information in FIG. 24. Following this, at step S255 a check is performed to determine whether a reply is designated in the variable "exec". When a reply is not designated, a value indicating "no reply" is returned, and processing is thereafter terminated.

At step S256 a designated response timing, a designated response content, a designated response media and an addressee, which are acquired by the status acquisition unit 71 and correspond to the variable "state", are stored in the variables "timing", "contents", "media" and "direct" by referring to the response method definition information in FIG. 24. A value for "reply" is returned and the processing is thereafter terminated.

When status "upper cartridge copy paper out"=11 is stored in the variable "state" for status information acquired by the status acquisition unit 71, a corresponding output character string defined in FIG. 24 is valid. Thus, the output character string "copy paper out" is stored in the variable "sentence" for the response method selection information (16e in FIG. 29). When status "printer buffer abnormality"=3 is stored in the status information variable "state", an output character string is invalid. Thus, the portion "state" in the character string "error No.=state" is replaced by the actual value held in the variable "state", and character string "error No.=3" is stored in the variable "sentence" for response method selection information (17e in FIG. 30).

When status "upper cartridge copy paper out"=11 is stored in the variable "state" for status information acquired by the status acquisition unit 71, a reply is designated. Thus, other designated response methods are acquired, and the value "reply" is returned. Processing is thereafter terminated. When status "upper cartridge OUT"=10 is stored in the status information variable "state", no reply is designated, and a value for "no replay" is returned. Processing is thereafter terminated.

<Response Information Preparation Unit 73>

Figure 27:
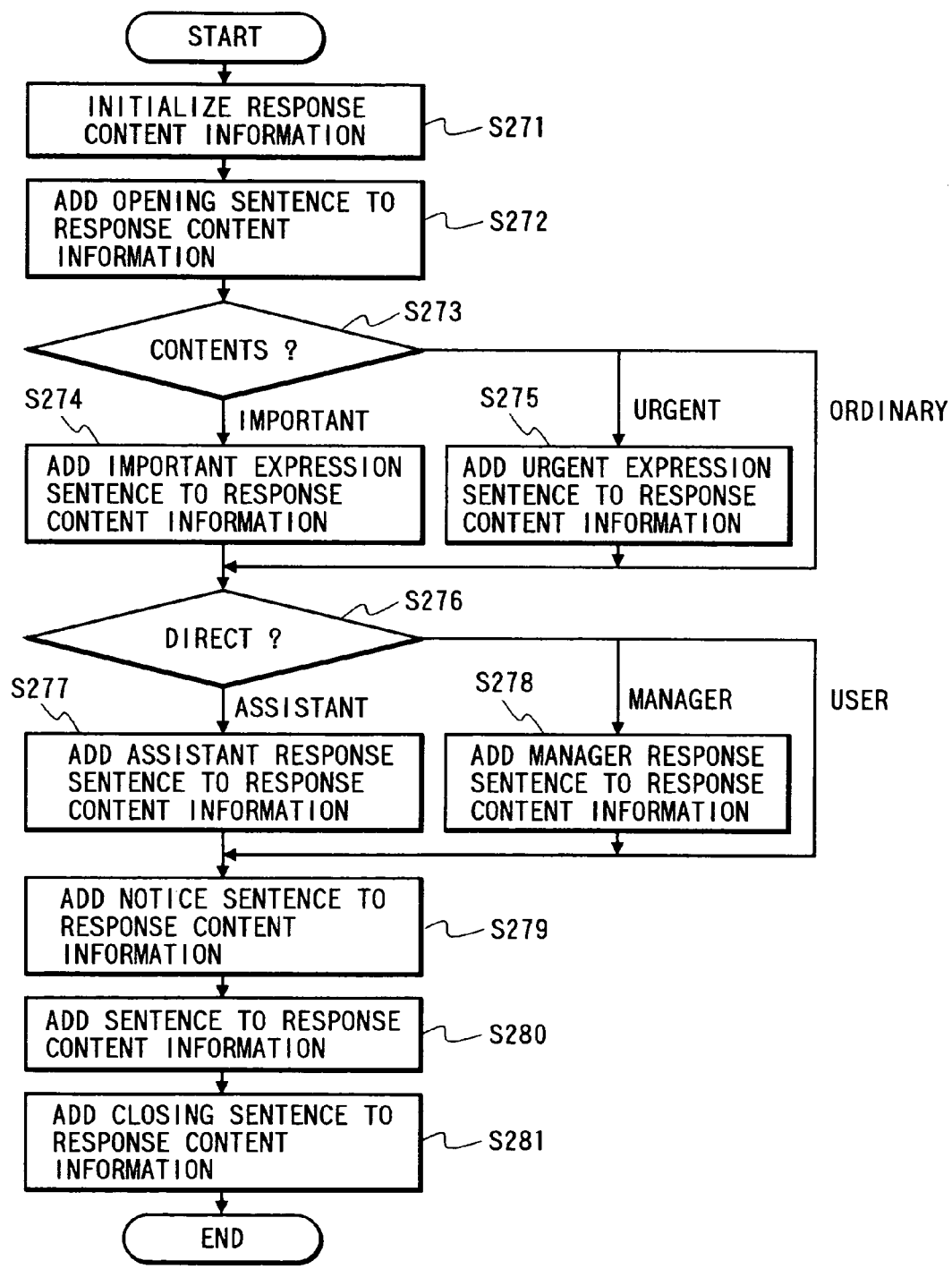
FIG. 27 is a flowchart of the overall processing performed by a response information preparation unit according to the second embodiment.

FIG. 27 is a flowchart for the processing performed by the response information preparation unit 73 in the second embodiment.

FIG. 28 is a diagram showing information for the preparation of mail response content information that is referred to by the response information preparation unit 73 in the second embodiment. For information concerning the preparation of mail response content information, corresponding character strings are defined that consist of response contents.

Figure 29:
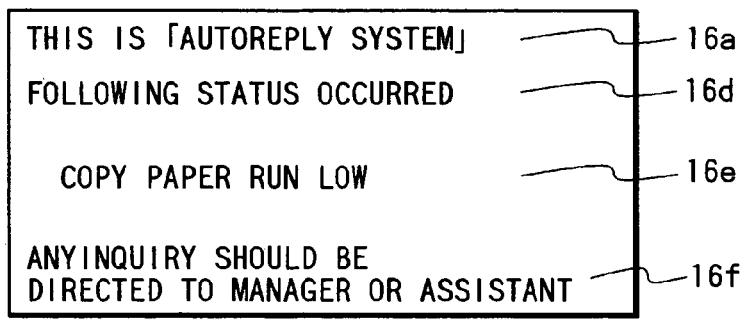
FIG. 29 is a diagram illustrating example response content information when a user is designated as a responder relative to a status.

FIG. 29 is a diagram illustrating example response content information that is prepared by the response information preparation unit in the second embodiment, and is used when a user is designated as a responder relative to the status of the response method definition information in FIG. 24.

Figure 30:
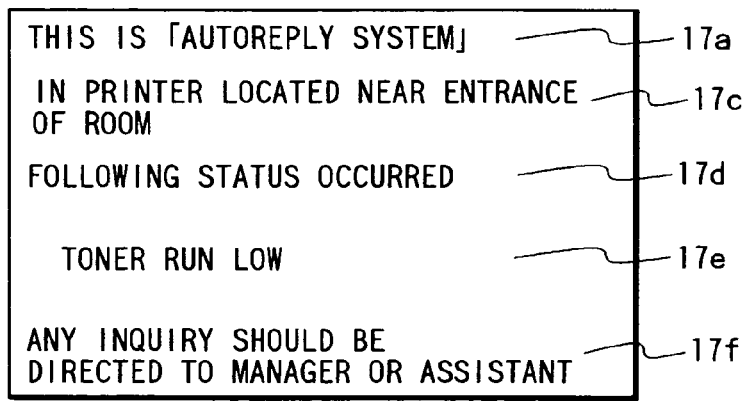
FIG. 30 is a diagram illustrating example response content information when an assistant is designated as a responder relative to a status.

FIG. 30 is a diagram illustrating response content information that is prepared by the response information preparation unit 73 in the second embodiment, and is used when an assistant is designated as a responder relative to the status of the response method definition information in FIG. 24.

When the response information preparation unit 73 is activated, at step S271 response content information is initialized as blank character strings, and at step S272 a character string corresponding to an "opening sentence" is added to the response content information by referring to the response content preparation information in FIG. 15 (16a in FIG. 16 or 17a in FIG. 17).

At step S273 program control branches by referring to designations for the response contents that are stored in the variable "contents" for the response method selection information that is selected by the response method selection unit 72. When the response content is designated to be important, program control moves to step S274 whereat a character string corresponding to "important expression sentence" is added to the response content information. When the response content is designated urgent, program control goes to step S275 whereat a character string corresponding to "urgent expression sentence" is added to the response content information. When the response content is designated as normal, no particular process is performed and program control advances to step S276.

At step S276 program control branches by referring to designations for an addressee that is stored in the variable "direct" for response method selection information that is selected by the response method selection unit 72. When an assistant is designated as an addressee, program control moves to step S277, whereat a character string corresponding to "assistant response sentence" is added to the response content information. When a manager is designated as an addressee, program control goes to step S278, whereat a character string corresponding to "manager response sentence" is added to the response content information (17c in FIG. 30). When a user is designated as an addressee, no particular process is performed and program control advances to step S279.

At step S279, a character string corresponding to "notice sentence" is added to the response content information by referring to the response content preparation information in FIG. 28 (16d in FIG. 29 or 17d in FIG. 30).

At step S280 information in the variable "sentence" for the response method selection information stored in the response method selection unit 72 is added to the response content information (16e in FIGS. 29 and 17e in FIG. 30).

At step S281 a character string corresponding to "closing sentence" is added to the response content information by referring to the response content preparation information in FIG. 28 (16f in FIGS. 29 and 17f in FIG. 30), and the resultant response content information is returned. Processing is thereafter terminated.

An explanation will now be given for an example where the status returned from the status acquisition unit 71 is status "upper cartridge copy paper remaining 10%"=13. The response content designated in the variable "contents" for the response method selection information, which is selected by the response method selection unit 72, is "ordinary", and an address designated in the variable "direct" is a "user". Therefore, at either step S273 or S276, no character string is added to the response content information. Then, the information "copy paper running low" in the variable "sentence" is added to the response content information (16e in FIG. 29). As a result of the processing, the response content information shown in FIG. 29 is prepared.

Now, an explanation will be given for another example where the status returned from the status acquisition unit 71 is status "toner remaining 10%"=33. The response content designated in the variable "contents" for the response method selection information that is selected by the response method selection unit 72 is "ordinary", and an address designated in the variable "direct" is an "assistant". Thus, at step S273 no character string is added to the response content information, but at step S276 the character string "in printer located near entrance", which corresponds to an assistant response sentence, is added to the response content information (17c in FIG. 30). Following this, the information "toner running low" in the variable "sentence" is added to the response content information (17e in FIG. 30). As a result of the processing, the response content information shown in FIG. 30 is prepared.

<Response Information Output Unit 74>

Figure 31:
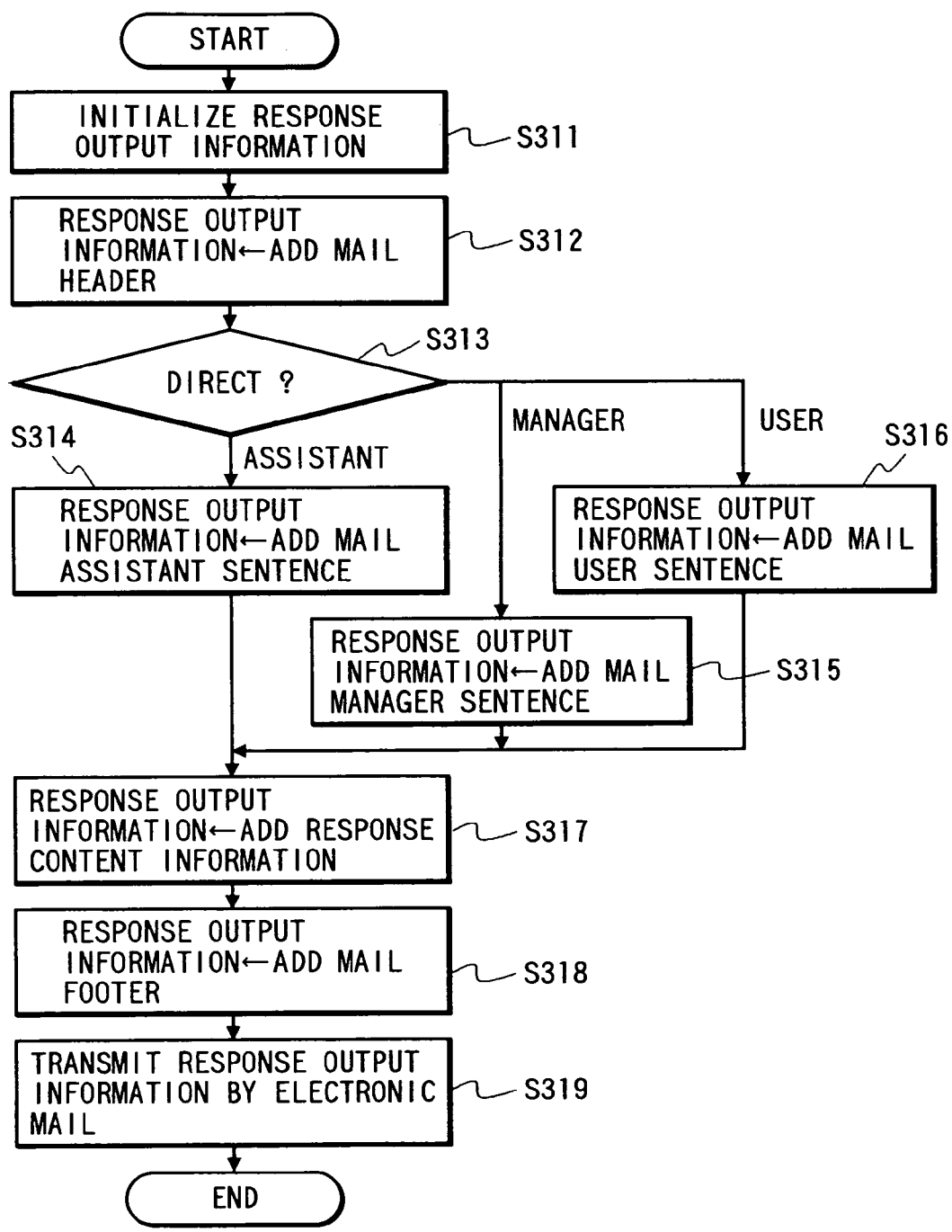
FIG. 31 is a flowchart of the overall processing performed by a response information output unit according to the first embodiment.

FIG. 31 is a flowchart showing the processing performed by the response information output unit 74 in the second embodiment.

FIG. 32 is a diagram showing information for the preparation of response output information that is referred to by the response information output unit 74 in the second embodiment. In the table for the preparation of response output information are defined corresponding character strings consisting of mail that is to be output.

FIG. 33 is a diagram illustrating example response output information that is prepared and output by the response information output unit 74 in the second embodiment.

When the response information output unit 74 is activated, at step S311 response output information is initialized as a blank character string. At step S312 a character string corresponding to a "Mail header" is added to the response output information by referring to the information for the preparation of response output information in FIG. 32 (20a in FIG. 33).

At step S313 program control branches by referring to a designated addressee stored in the variable "direct" for the response method selection information that is selected by the response method selection unit 72. When an assistant is designated as an addressee, program control moves to step S314 whereat a character string corresponding to "Mail assistant sentence" is added to the response content information. When a manager is designated as an addressee, program control moves to step S315 whereat a character string corresponding to "Mail manager sentence" is added to the response content information. When a user is designated as an addressee, program control moves to step S316 whereat a character string corresponding to "Mail user sentence" is added to the response content information (20b in FIG. 33).

At step S317 the response content information returned from the response information preparation unit 73 is added to the response output information (20c in FIG. 33). At step S318 a character string corresponding to a "Mail footer" is added to the response output information by referring to the information for preparation of response output information in FIG. 32 (20d in FIG. 33).

Finally, at step S319 the response output information thus prepared is transmitted as electronic mail.

An explanation will now be given for an example where a status returned from the status acquisition unit 71 is status "toner remaining 10%"=33. An "assistant" is an addressee designated in the variable "direct" for the response method selection information that is selected by the response method selection unit 72. Thus, at step S313 character string "To Taro Joshu <joshu@xxx.yyy.co.jp>", which corresponds to a "Mail assistant sentence", is added to the response content information (20b in FIG. 20). At step S317 the response content information prepared by the response content preparation unit 73 is also added to the response content information (20c in FIG. 33). In addition, at step S318 a "Mail footer" is added to the response content information. Therefore, the response content information shown in FIG. 33 is prepared, and at step S319 is transmitted as electronic mail. The processing is thereafter terminated.

[Modification of Second Embodiment]

The status defined as response method definition information in which the status and a response method correspond to each other may also include a combination of a plurality of statuses. Further, the response methods for the individual statuses are employed to construct a rule for a response method for a combination of a plurality of statuses.

In addition, a status defined in the response method definition information in which the status and the response method correspond to each other may include a change in the status as time elapses. A plurality of statuses that occur at the same time may be included.

In a case where a plurality of errors, such as lack of toner and paper, occur at the same time, these errors may be regarded as critical errors, even though each of the errors is regarded as merely an ordinary error, or a response timing may be changed.

Different types of languages may be defined in the response method definition information, and may be selected in consonance with an acquired printer status while referring to the response method definition information. For example, the native languages of users may be registered and the native language of an addressee user may be selected.

In addition, a detailed explanation may be selected in consonance with an acquired printer status, while referring to the response method definition information. Explanations that are given may differ, for example, for common users and for a manager and an assistant.

Furthermore, a re-response method may be selected in consonance with an acquired printer status, while referring to the response method definition information, or to the number of re-responses may be selected.

As is described in the first embodiment, a telephone, a management system, a home page, a voice, a pocket bell or a facsimile machine may be used as a response medium.

According to the above described embodiment, since a response method that is appropriate for a status is selected, the focus of a user's attention is increased for an important response, and since a response is transmitted only to an appropriate user, the transmission of an unwanted response can be avoided.

Third Embodiment

Operating features of a third embodiment are that, in consonance with each printer status, a user designates in advance, as a status-response method corresponding data (response method definition information), a need for a reply, a response content, a response medium, a response addressee and a response timing, and that, in consonance with an acquired printer status, the status-response method corresponding data are referred to in order to determine the need for a reply, a response content, a response medium, a response addressee and a response timing. The status-response method corresponding data is used to indicate individual statuses. Another feature is the employment of electronic mail as an available response media.

<Example Arrangement of System>

Figure 34:
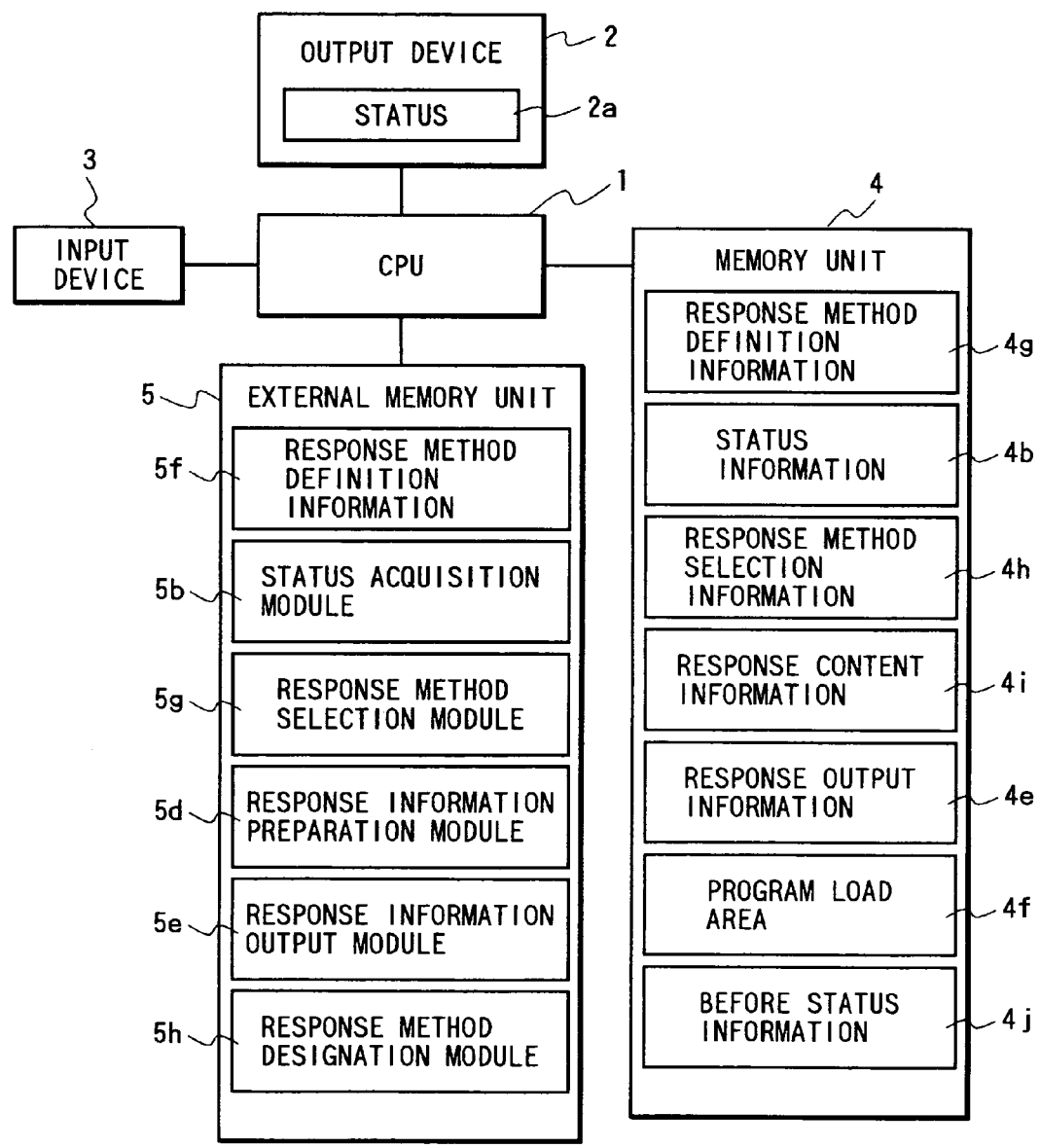
FIG. 34 is a block diagram illustrating an example hardware arrangement for an information processing system according to a third embodiment of the present invention.

FIG. 34 is a block diagram illustrating an example hardware arrangement for an information processing system according to a third embodiment. Since the arrangement in FIG. 34 is substantially the same as that in FIG. 6 or 21 and only one part of the contents stored in an external memory unit 5 differs, an explanation is given for only the portion not shown in FIGS. 6 and 21.

In the external memory unit 5, a response method designation module 5h is a program for implementing a function of a response information designation unit 76, which will be described later.

<Processing Configuration>

Figure 35:
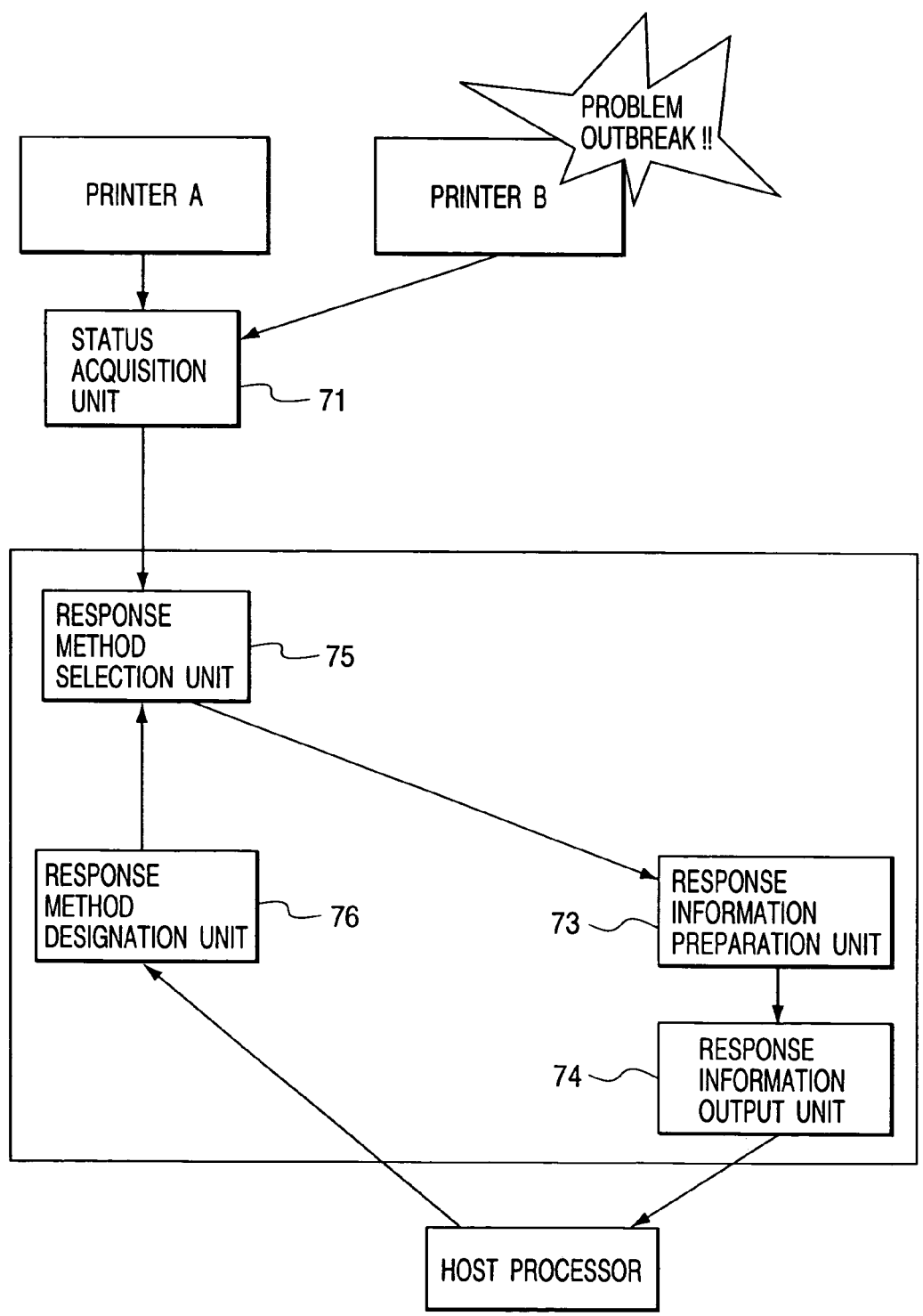
FIG. 35 is a diagram illustrating an example processing structure according to the third embodiment.

FIG. 35 is a diagram showing the processing configuration according to a third embodiment. One difference from that in FIG. 22 is that the response method definition information, which is referred to by a response method selection unit 72, can be re-defined by the response method designation unit 76.

Figure 36:
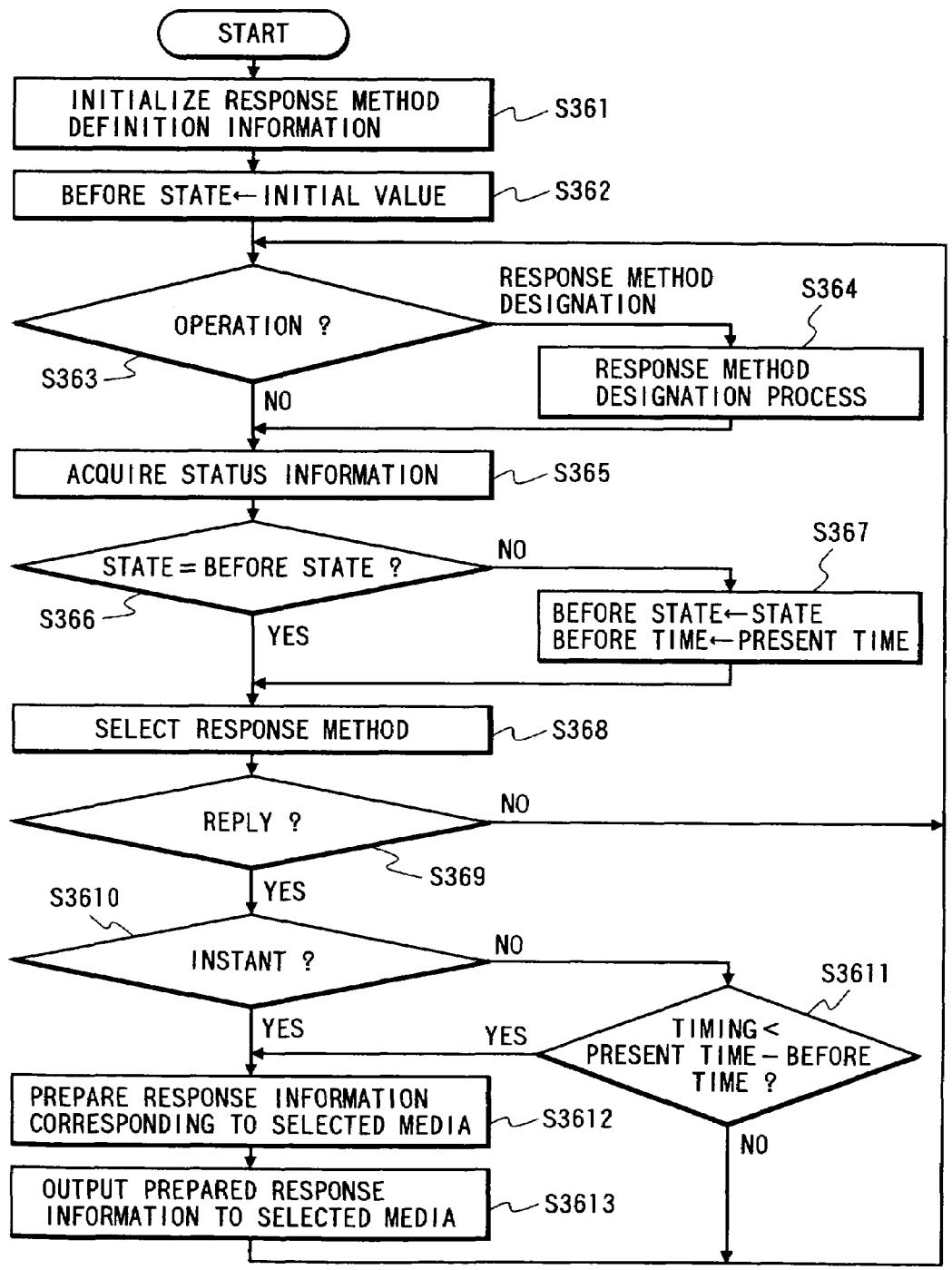
FIG. 36 is a flowchart of an example of the overall processing performed by the third embodiment.

FIG. 36 is a flowchart of the overall processing performed for the third embodiment. In the third embodiment as well as in the second embodiment, the response method definition information shown in FIG. 24 is referred to.

The processing in FIG. 36 is provided by adding steps S363 and S364 to the processing in FIG. 36. Therefore, only these steps will be described.

At step S363 an operation performed by a user is examined. When an operation for "response method designation" is initiated, at step S364 a response method designation process is performed.

Among the individual units in FIG. 35, only the response method designation unit 76 will be explained in detail. Since the other units are the same as those in the second embodiment, no explanation for them will be given.

<Response Method Designation Unit 76>

Figure 37:
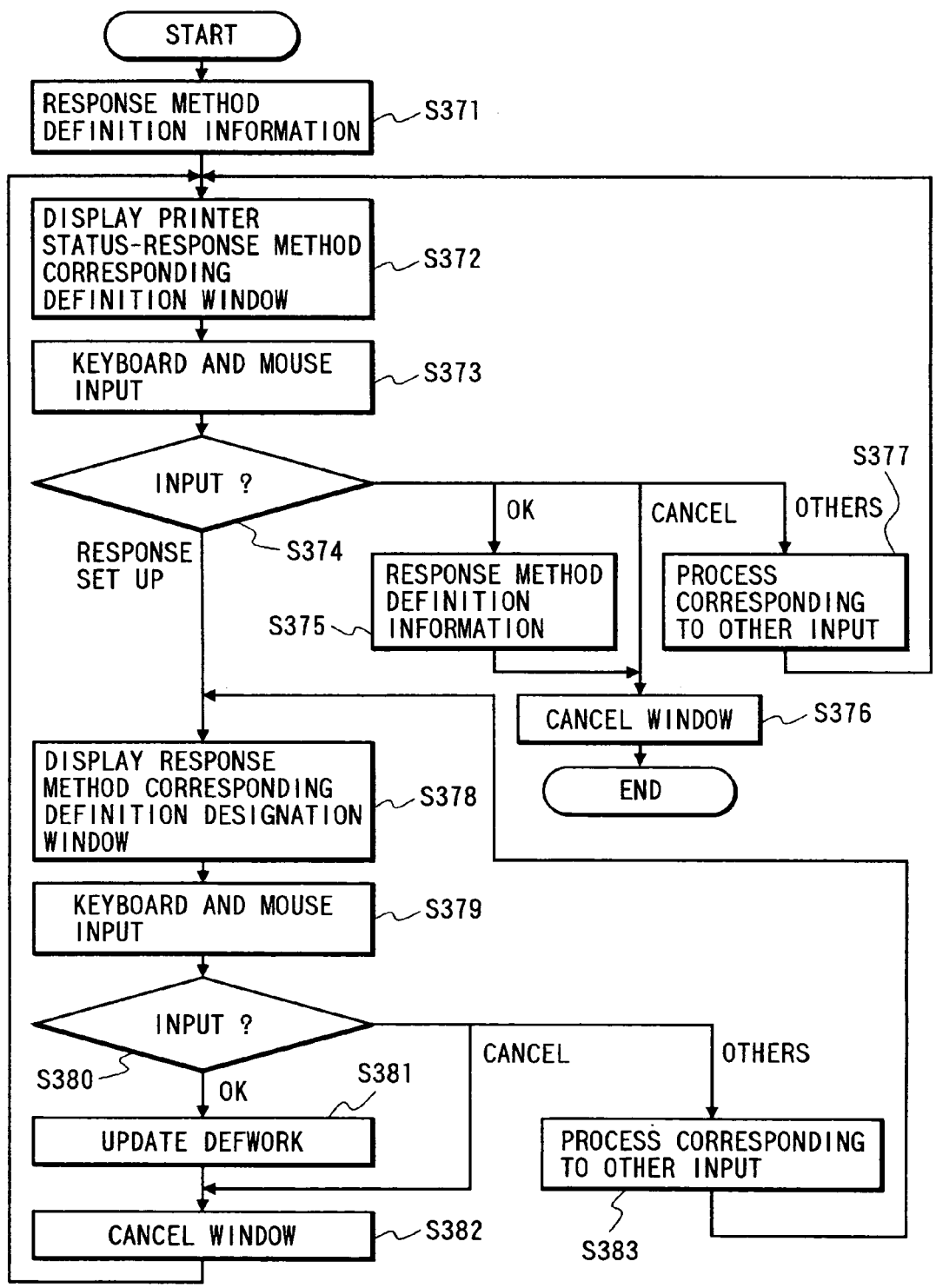
FIG. 37 is a flowchart of the overall processing performed by a response method designation unit according to the third embodiment.

FIG. 37 is a flowchart showing the processing performed by the response method designation unit 76 in the third embodiment.

Figure 38A:
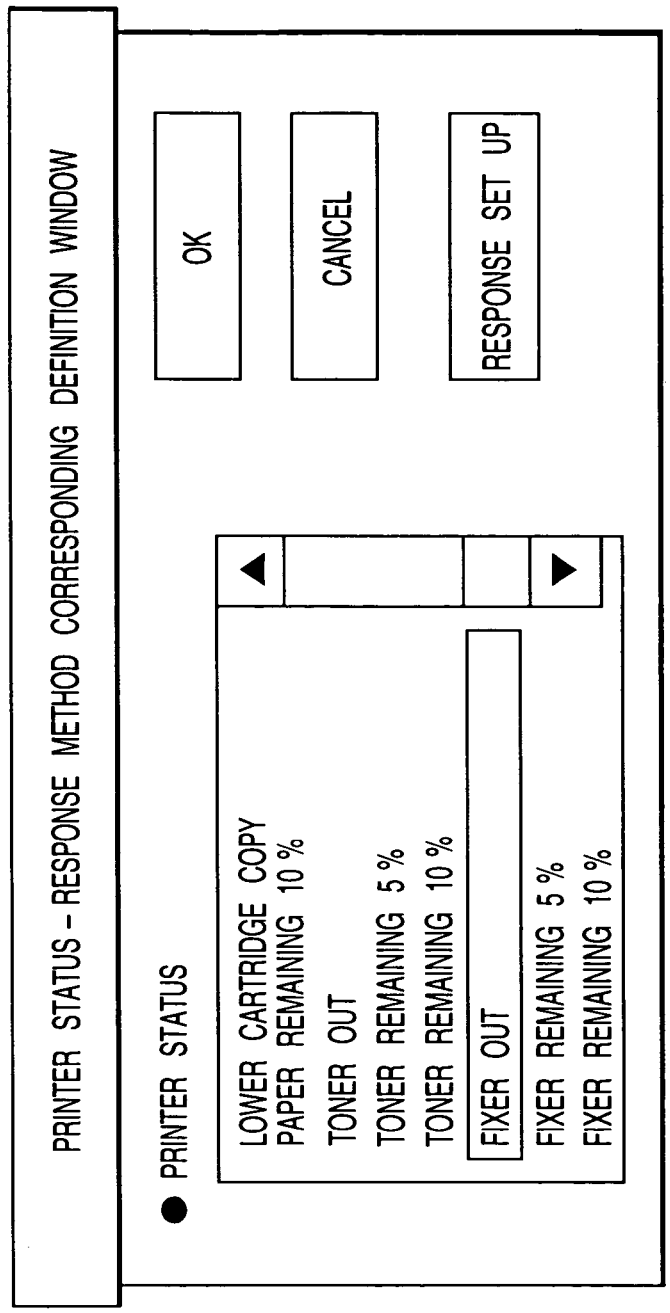
Figure 38C:
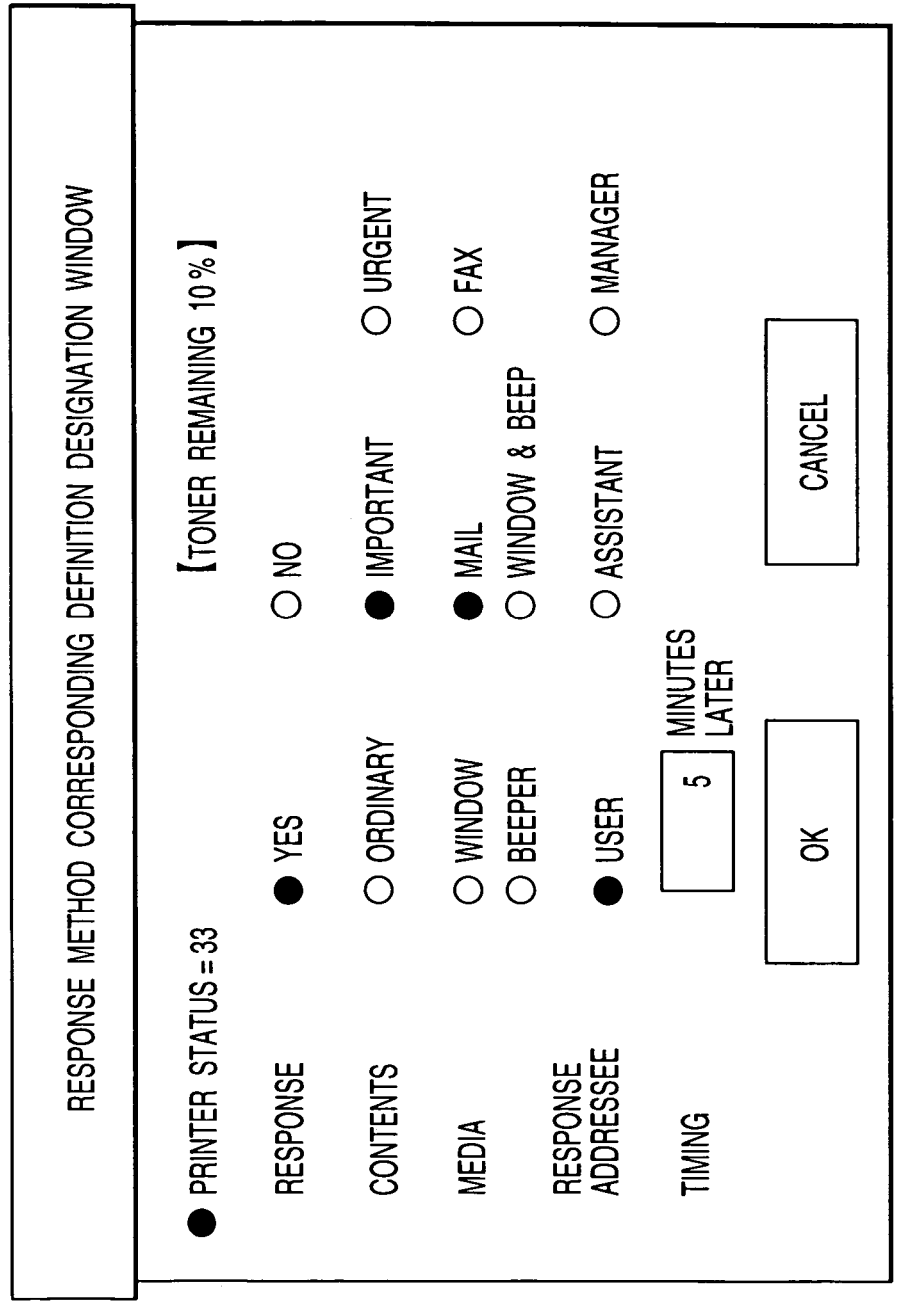

FIGS. 38A, 38B and 38C are diagrams illustrating windows displayed by the response method designation unit 76 in the third embodiment. In FIG. 38A is shown an example window that is first displayed after the response method designation unit 76 is activated. In FIG. 38B is shown an example window that is displayed when the status "toner remaining 10%" is designated from among the printer statuses and a response designation button is selected. In FIG. 38C is shown an example window after the columns in the window are changed using a keyboard or a mouse.

FIG. 39 is a diagram showing response method definition information that represents the meanings of the statuses of a printer, which were altered by the response method designation unit 76 in the third embodiment, and the definitions for response methods, such as the need for a response, response contents, a response medium, a response addressee, a response timing and an output character string. An article 9g indicated by hatching defines a portion that is altered in consonance with the designation in FIG. 38C.

When the response method designation unit 76 is activated, at step S371 the response method definition information 4g in FIG. 34, i.e., information indicated in the printer status-response method corresponding table in FIG. 24, is stored in the local memory area "Defwork".

At step S372, information defined in the Defwork is displayed in a printer status-response method corresponding definition window in FIG. 38A. At step S373 entry from a user is accepted, and at step S374 the input operation type is determined, program control branching to a process that corresponds to the detected input operation. In the printer status-response method corresponding definition window are included an operation portion, for selecting a status for designating the definition of a response method; a button "response setup" for displaying a window for designating a definition relative to a selected status; a button "OK" for establishing a designated definition and for ending the process; and a button "cancel" for canceling a designated definition and ending.

When an operator depresses the button "response setup", program control goes to step S378, whereat a response method corresponding to a designated status is defined. When an operator depresses the button "OK", program control goes to step S375. At step S375 information in the memory area "Defwork" is stored in the response method definition information, and at step S376 a window is erased and the processing is thereafter terminated. When an operator performs the other process, program control goes to step S377, whereat a process corresponding to the other entry is performed, and program control then returns to step S372 to again display a window. When, for example, status "toner remaining 10%" in the operating portion is selected using a mouse to designate the status, the display is inverted so that the operator understands that the portion has been selected.

At step S378 the definition of the response method for the status that is designated during the processing is displayed using the response method corresponding definition designation window in FIG. 38B. At step S379 an entry from an operator is accepted. At step S380 the type of operation is determined, and program control branches to a process corresponding to the input operation. In the response method corresponding definition designation window is displayed a definition that is designated for an article of a response method that can be defined relative to a designated status.

The setups for the response method that is currently defined are provided with black circles, and the other setups that can be re-defined are provided with white circles. The value of a designated time is indicated as the article "Timing" in the response method. This window further includes a button "OK" for establishing a designated definition and returning to the original printer status-response method corresponding definition window, and a button "cancel" for canceling a designated definition and returning to the original window.

When an operator depresses button "OK", program control moves to step S381. At step S381 information in the memory area "Defwork" is updated by the displayed setup, and at step S382 the window is erased. Program control thereafter returns to step S372. When an operator depresses the button "cancel", program control goes to step S382, whereat the window is erased, and returns to step S372. When an operator preforms the other process, program control moves to step S383, whereat a process corresponding to the other entry is performed, and returns to step S378, whereat the window is again displayed. When "important" is selected as a response content by using a mouse, for example, the white circle is changed to a black circle to indicate that the portion has been selected, and the previously designated portion is changed from a black circle to a white circle.

The window that is altered by the above described operation by an operator is shown in FIG. 38C. In this example, the response content and an addressee are changed and are designated as "important" and "user". When with this setup button "OK" in the response method corresponding definition designation window is depressed and the button "OK" in the printer status-response method corresponding definition window is also depressed, the response method definition information is changed. As a result, the definition is altered as is shown in the hatching highlighted portion 9g in the printer status-response method correspondence table in FIG. 39. Then, since before alteration the response status "toner remaining 10%" is directed to another assistant at the ordinary importance level, the response after the alteration is directed to a user at a high importance level.

[Modification of Third Embodiment]

In the third embodiment, the selection articles in the second embodiment may be designated. In other words, the type of language, a detailed explanation, the conditions for a response, a re-response method, and the number of re-responses may be designated.

In the above described embodiment, since individual users can freely designate a response method, the focus of a user's attention is increased for an important response, and since a response is transmitted only to an appropriate user, the transmission of an unwanted response can be avoided as much as possible.

Fourth Embodiment

Operating features of a fourth embodiment are that whether or not as the result of a response a malfunction has been resolved is evaluated, and that a response is retransmitted using another method when a user does not notice a response or when a user is not prepared to handle the response.

<Example Arrangement of System>

Figure 40:
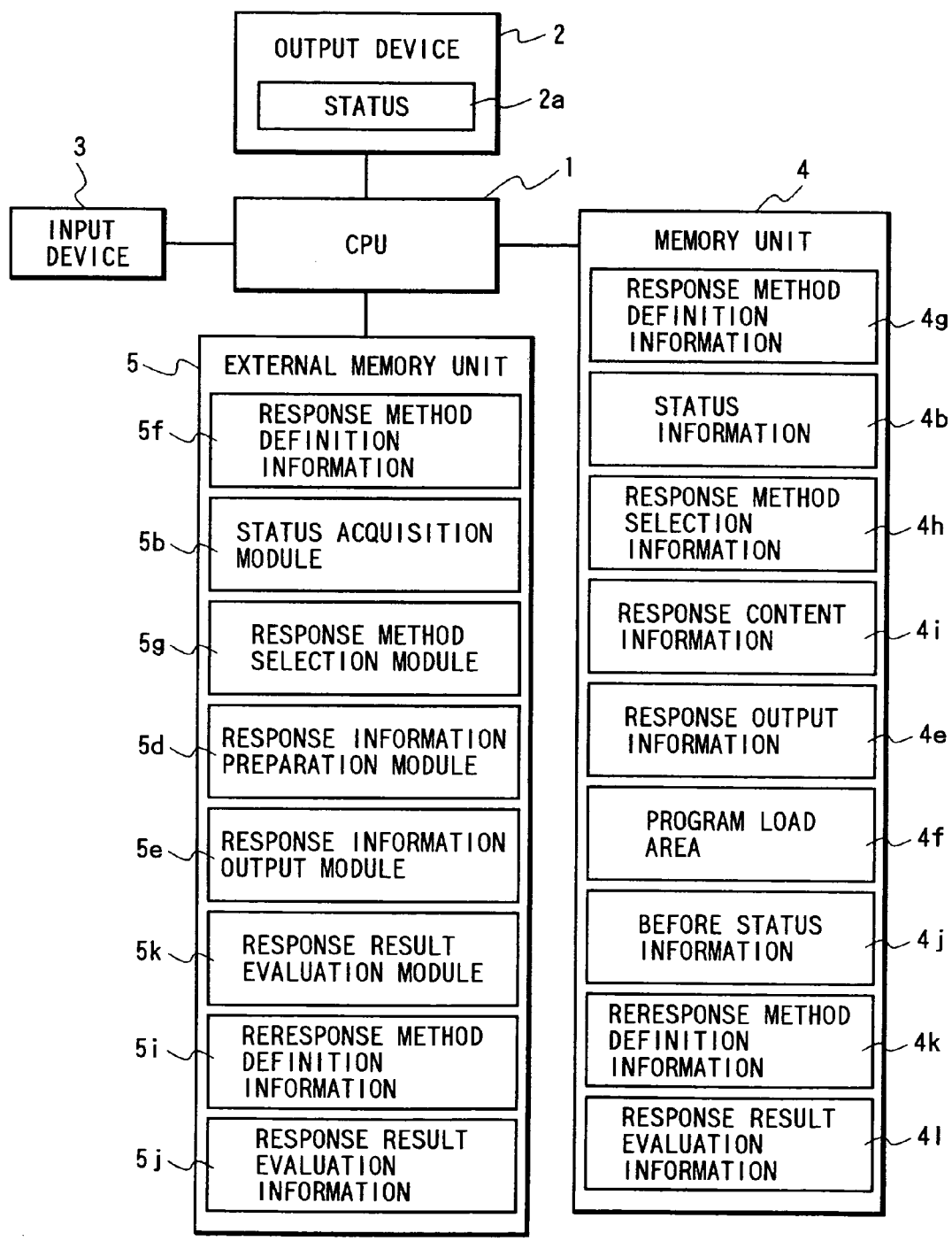
FIG. 40 is a block diagram illustrating an example hardware arrangement for an information processing system according to a fourth embodiment of the present invention.

FIG. 40 is a block diagram illustrating an example hardware arrangement for an information processing system according to the fourth embodiment. Since the arrangement in FIG. 40 is substantially the same as that in FIG. 6, 21 or 34, and as only one part of the contents stored in a memory unit 4 and an external memory unit 5 is different, an explanation will be given only for the portions that are not shown in FIGS. 6, 21 and 34.

In the memory unit 4, a re-response method definition information memory area 4k is employed to store definitions of a limitation method for a re-response method when a response fails, and a response result evaluation information area 41 is employed to store a definition for status information at the normal time relative to acquired status information.

In the external memory unit 5, a response result evaluation module 5k is a program for implementing the function of a response result evaluation unit 77, which will be described later. A re-response method definition information memory area 5i is employed to store a definition for a limitation method of a re-response method when a response fails, and a response result evaluation information memory area 5j is employed to store a definition of status information at the normal time relative to acquired status information.

<Processing Configuration>

Figure 41:
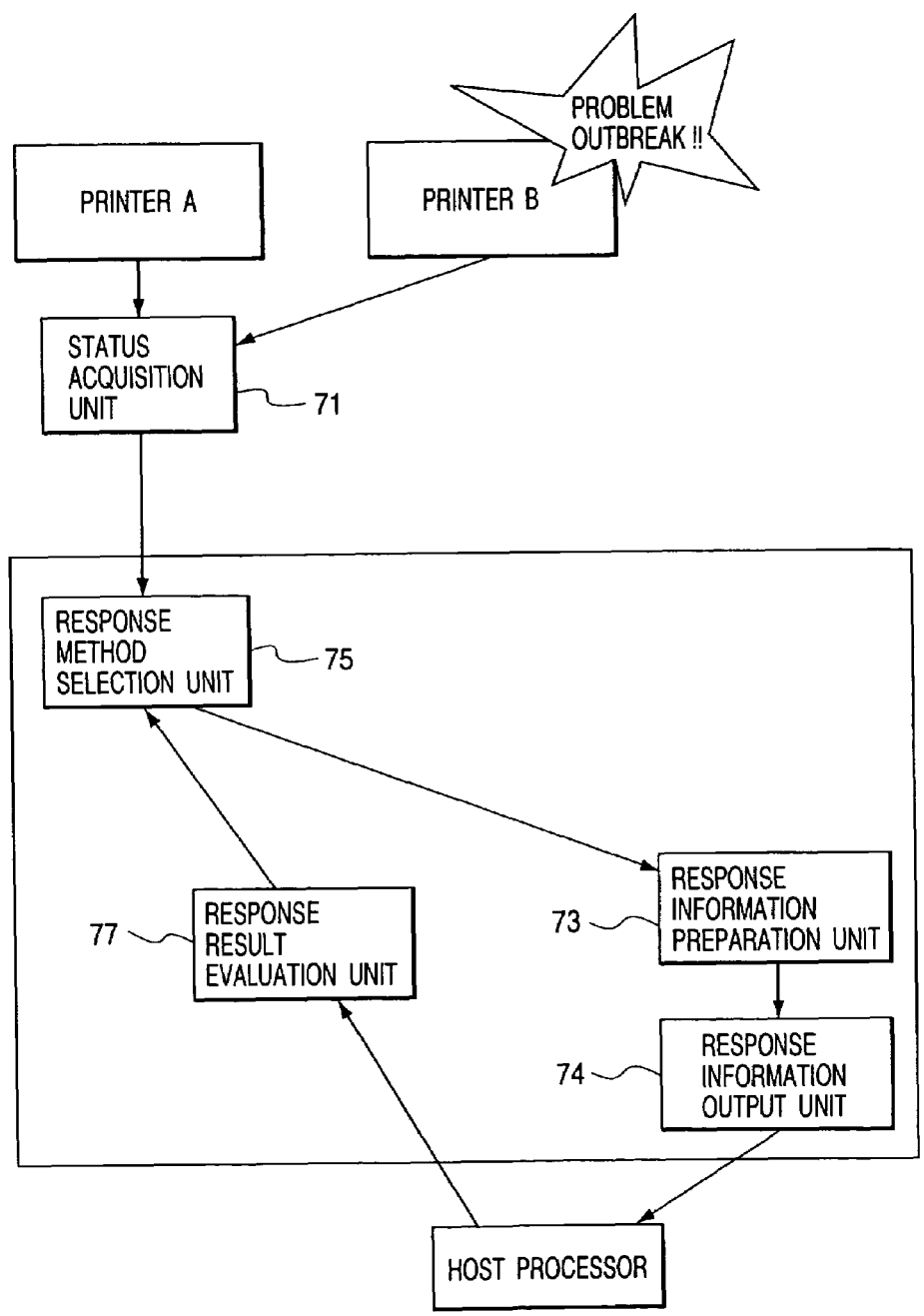
FIG. 41 is a diagram illustrating an example processing structure according to the fourth embodiment.

FIG. 41 is a diagram showing an example processing configuration according to the fourth embodiment. The difference from the diagram in FIG. 22 will be described below. The response result evaluation unit 76 evaluates whether or not a problem is resolved as the result of a response. When it is ascertained that the response has succeeded, a process sequence is terminated. When it is ascertained that the response has failed, a response method selection unit 75 selects a re-response method again in accordance with the definition in the re-response method definition information 4k. Then, response content is prepared, output and evaluated in the same manner as for the previous response.

The individual units in FIG. 41 will now be described in detail.

Figure 42:
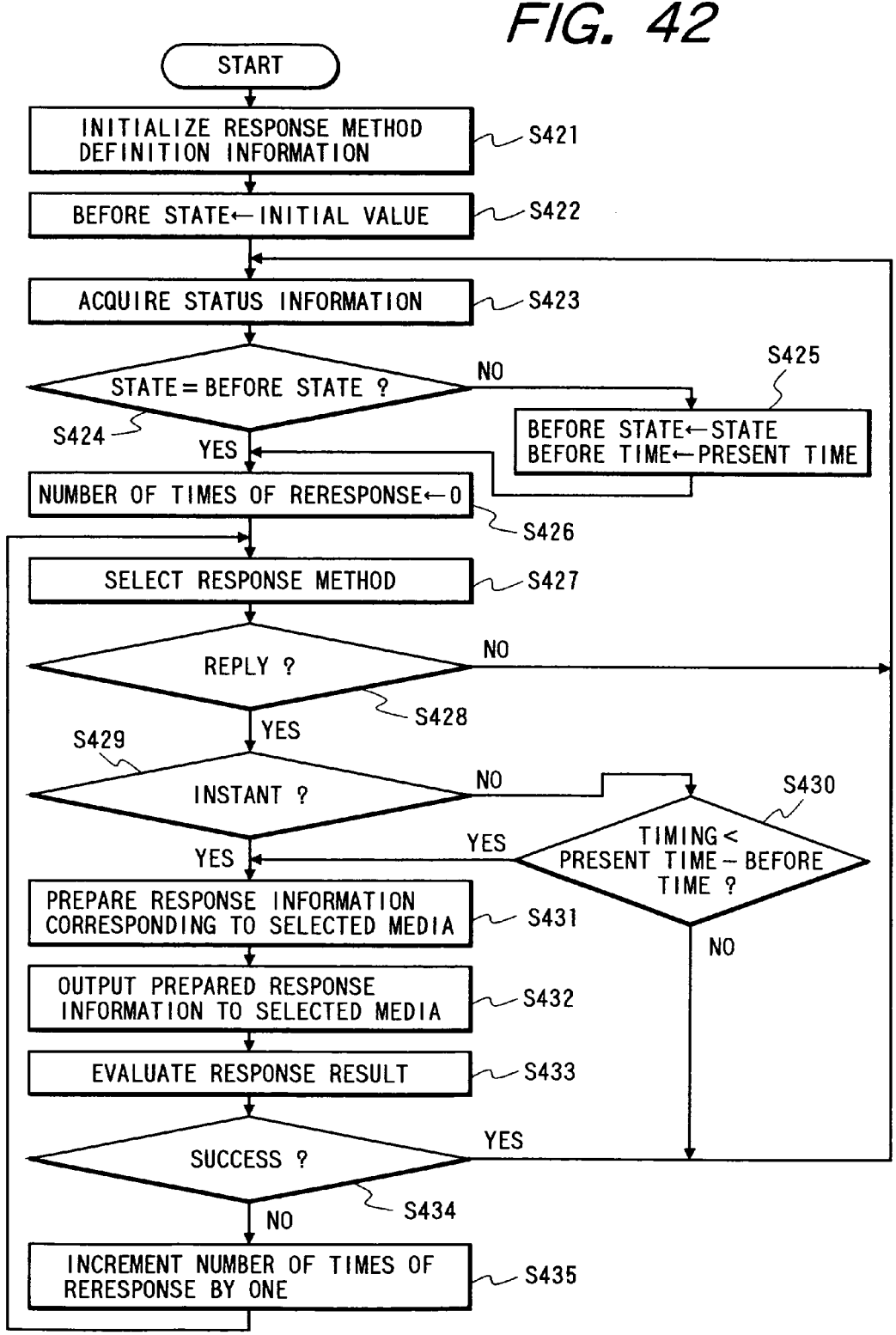
FIG. 42 is a flowchart of an example of the overall processing performed according to the fourth embodiment.

FIG. 42 is a flowchart of the overall processing performed by the fourth embodiment.

When a system according to the fourth embodiment is activated, at steps S421 to S425 the same processes are performed as are performed at steps S231 to S235 in FIG. 23. At step S426 the re-response count is initialized at 0, and at steps S427 to S432 the same processes are performed as are performed at steps S236 to S241 in FIG. 23.

At step S434 whether or not a problem is resolved as the result of the response is evaluated. When, at step S434, the response was successful, no process is performed and program control returns to step S423.

At step S435 the re-response count is incremented by one, and program control then returns to step S427. The re-response method is acquired by referring to the re-response method definition information in FIGS. 47 and 48, and is stored in the response method selection information memory area 4h. The processing at step S427 and the following steps is thereafter repeated.

<Status Acquisition Unit 71>

Since a status acquisition unit 71 in this embodiment is the same as that in the second embodiment, no explanation for it will be given.

<Response Method Selection Unit 72>

Figure 43:
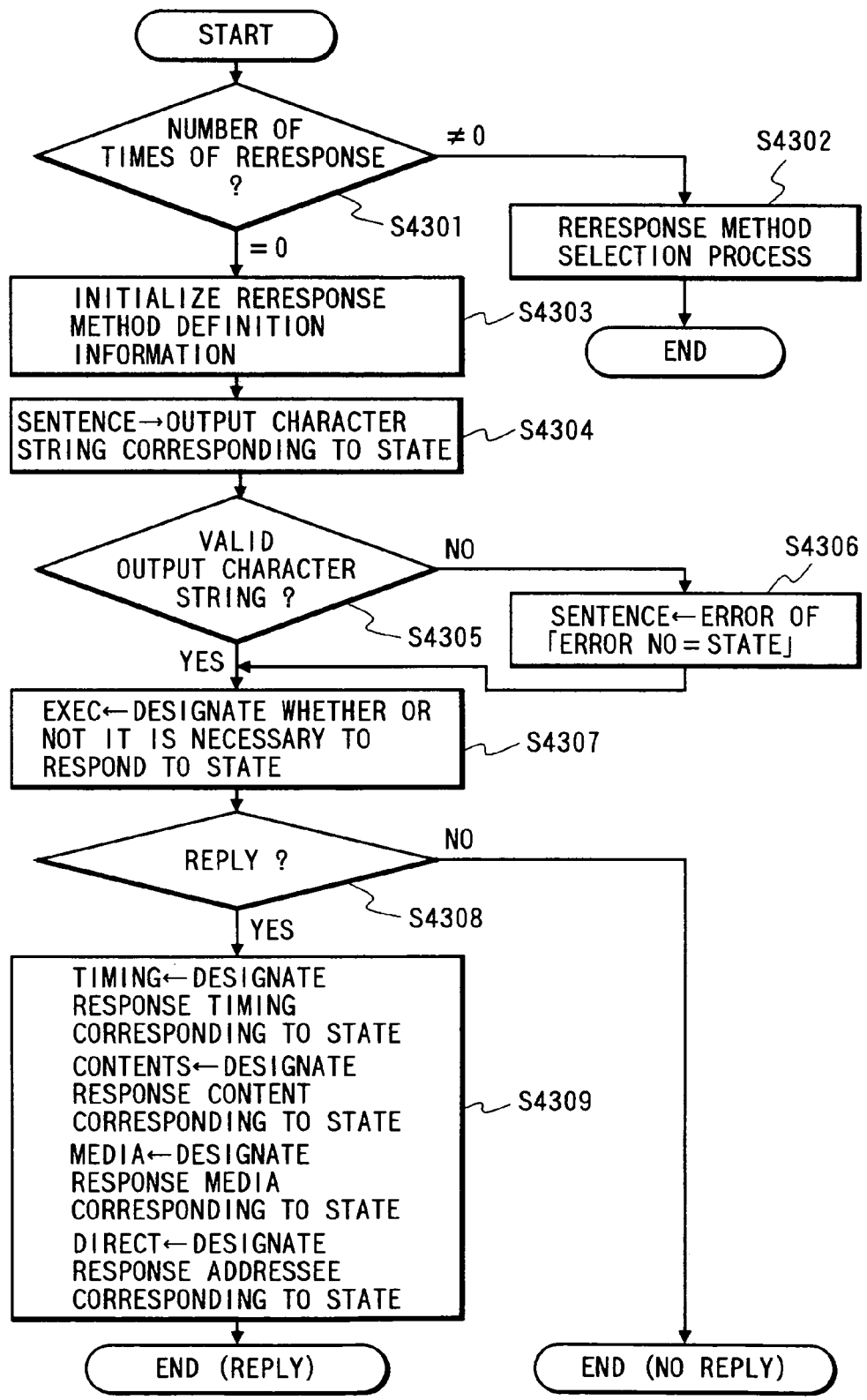
FIG. 43 is a flowchart of the overall processing performed by a response method selection unit according to the fourth embodiment.

FIG. 43 is a flowchart showing the processing performed by a response method selection unit 72 in the fourth embodiment.

In the fourth embodiment, when the response method selection unit 72 is activated, at step S4301 the re-response count is checked. When the re-response count is other than 0, the re-response method selection process at step S4302 is performed, and a re-response method is selected. The processing is thereafter terminated.

When the re-response count is 0, program control moves to step S4303 and the re-response method definition information 4k is initialized as is shown in FIG. 47.

Since the following steps S4304 to S4309 are the same as the steps S251 to S256 in FIG. 25, no explanation for them will be given.

<Response Information Preparation Unit 73, Response Information Output Unit 74>

Since a response information preparation unit 73 and a response information output unit 74 are the same as those in the second embodiment, no explanation for them will be given.

<Response Result Evaluation Unit 76>

Figure 44:
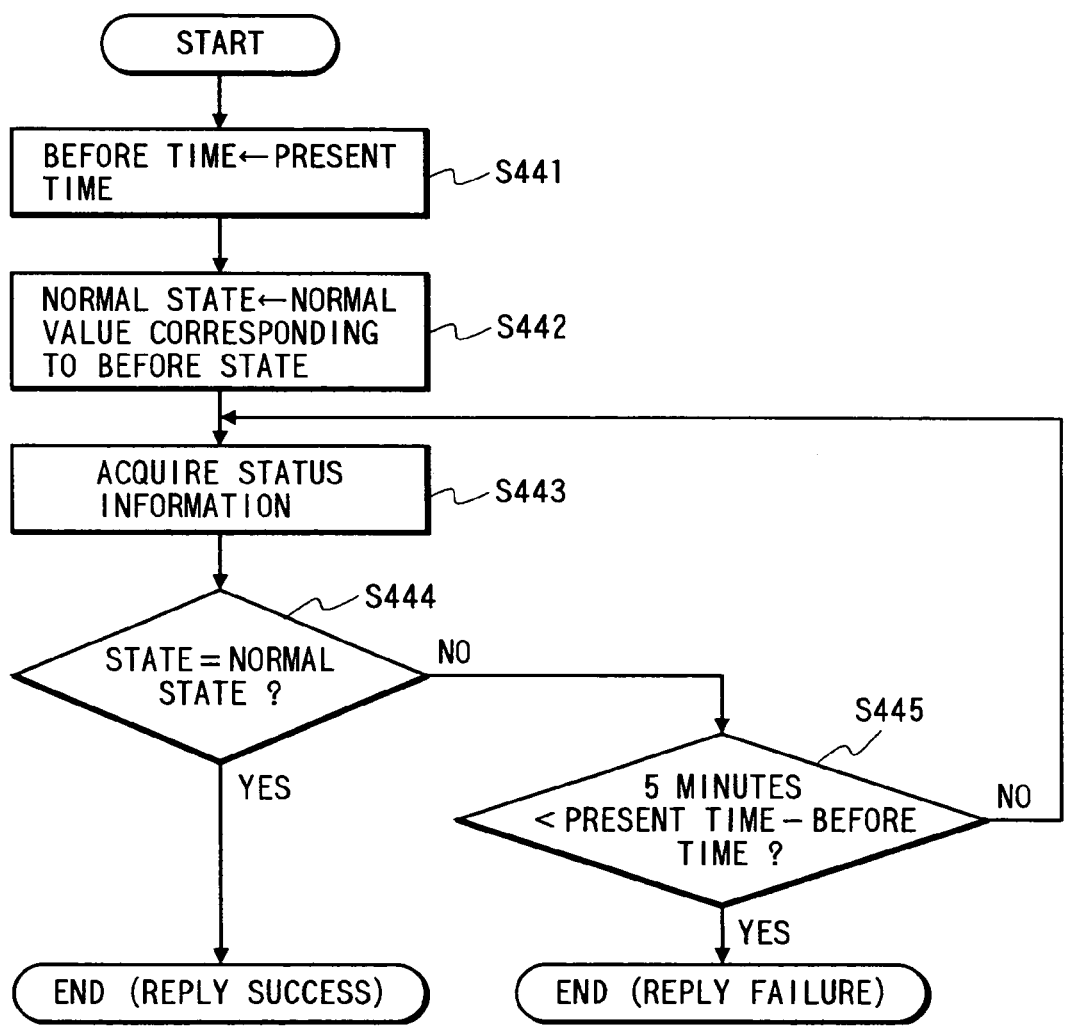
FIG. 44 is a flowchart of the overall processing performed by a response result evaluation unit according to the fourth embodiment.

FIG. 44 is a flowchart showing the processing performed by the response result evaluation unit 76 in the fourth embodiment.

FIG. 45 is a diagram for a response result evaluation information table, which is referred to by the response result evaluation unit 76 in the fourth embodiment and in which are stored definitions for normal time status information corresponding to acquired status information.

When the response result evaluation unit 76 is activated, at step S441 the current time is stored in the variable "BeforeTime". At step S442 the response result evaluation information in FIG. 22 is referred to and the normal time status information corresponding to the acquired status information is stored in the variable "NormalState".

At step S443 a printer status indicating the status of the printer is acquired, and is stored in the status information. At step S444 the status information variable "state" is compared with the variable "NormalState". When both variables differ, program control moves to step S445. When the variables match, "reply success" is ascertained, and the processing is terminated.

At step S445 the time stored in the variable "BeforeTime" is compared with the current time to determine whether or not a predetermined time has elapsed following a response. When a predetermined time has elapsed, "reply failure" is ascertained and the processing is terminated. When a predetermined time has not yet elapsed, program control returns to step S443 to repeat the check.

An explanation will now be given for a case where the status returned at step S433 is the status "upper cartridge copy paper out"=11. Assuming that the time at which the response information output unit 74 outputs a response corresponding to that status is 17:45:15, at step S441 that time is stored in the variable "BeforeTime". At step S442 the response result evaluation information in FIG. 22 is referred to, and status information 1 ("printing standby stage") at the normal time is stored in the variable "NormalState", relative to the acquired status information BeforeState=11 ("upper cartridge copy paper out") that is the origin of a response.

After, at step S443, the status is acquired and there is no change in status because, for example, a user who received a response has performed no action, the acquired status information is not changed from value 11 ("upper cartridge copy paper out") when the response is output. Therefore, when as a comparison at step S444, variable "state"=11 and variable "NormalState"=1 differ, program control goes to step S445 to determine how much time has elapsed since the response. Whether or not a predetermined time, e.g., five minutes in this embodiment, has elapsed is determined, and when five minutes have not elapsed, program control returns to step S443 to determine whether the status has changed. When five minutes or longer have passed, it is assumed that a user has not noticed a response or is not prepared to handle the response. The processing is thus terminated as "replay failure".

When within a predetermined time a user who received a response, or another user, resolves a problem indicated in the status information, or when a problem is naturally resolved for some reason, at step S444 the variable "state" and the variable "NormalState" are equal. The processing is therefore terminated as "reply success". When a user who received a response or another user adds paper in an upper cartridge, the status information acquired by the status acquisition unit 71 is status "printing standby stage"=1. Then, at step S444 variable "state"=1 and variable "NormalState"=1 are equal, so that the processing is terminated as "reply success".

In the response result evaluation information used in this example, the normal value is status "printing standby stage"=1, relative to all the acquired status information. However, different values may be provided for status information. For example, the same thing can be applied in a case where the normal value for the above status information "upper cartridge copy paper out" is either a value for "upper cartridge copy paper remaining 5%" or a value for "upper cartridge copy paper remaining 10%".

<Re-Response Method Selection Process>

Figure 46:
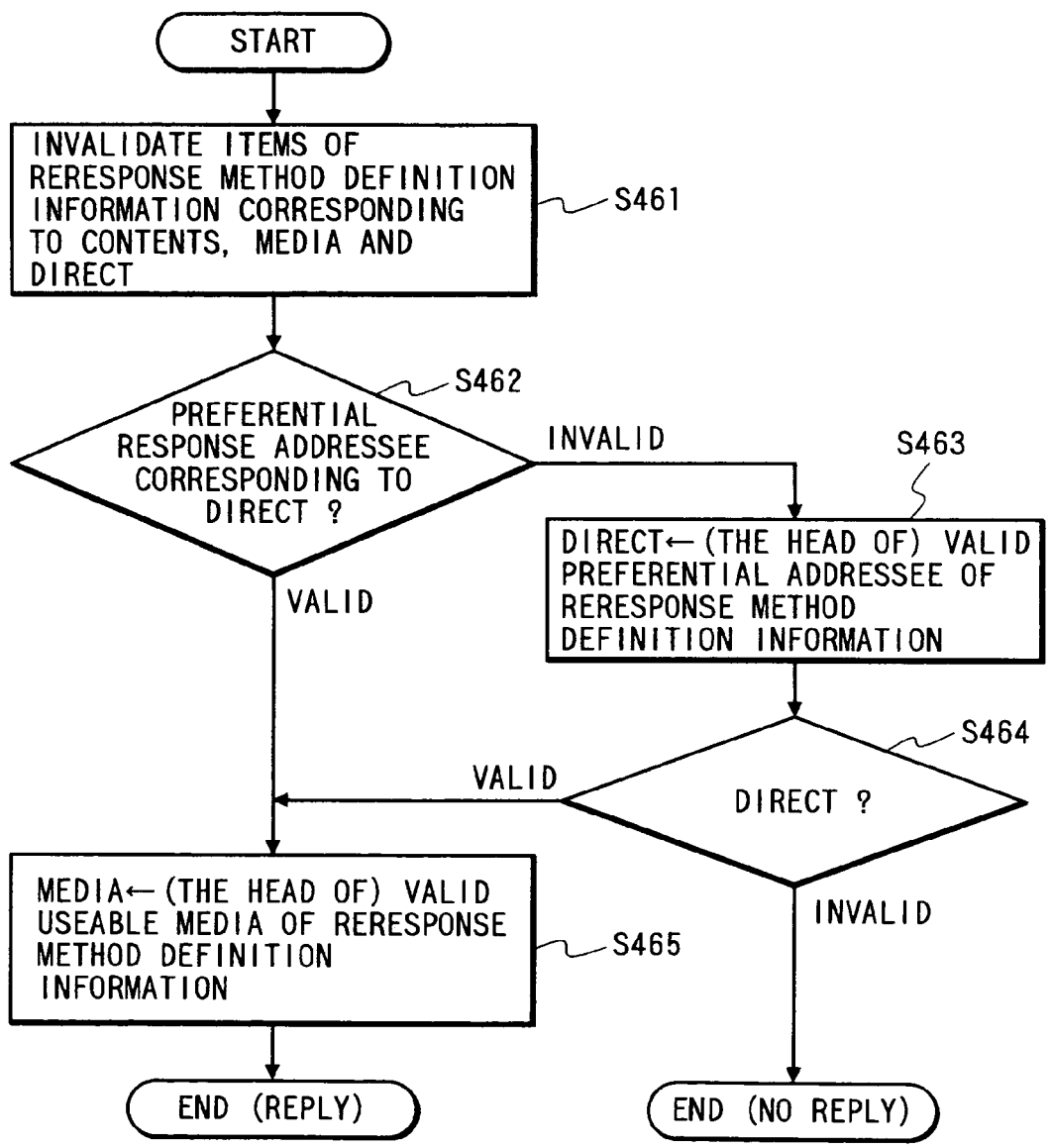
FIG. 46 is a flowchart showing a response method selection process according to the fourth embodiment.

FIG. 46 is a flowchart for the re-response method selection process according to the fourth embodiment.

FIG. 47 is a diagram showing example definitions for the initial state of re-response method definition information that is referred to and is updated by the re-response method selection process in the fourth embodiment.

FIG. 48 is a diagram showing example updated re-response method definition information, which is to be referred to and updated by the re-response selection process in the fourth embodiment.

After the re-response definition selection process is initiated at step S4302, first, at step S461 articles for re-response method definition information 4k, which correspond to the variables "contents", "media" and "direct" for response method selection information of the current response, are invalidated (FIG. 48).

As a result, at step S462 a check is performed to determine whether or not a preferential response addressee corresponding to the variable "direct" is valid. When the response addressee is valid, program control goes to step S465. When the response addressee is invalid, program control moves to step S463.

At step S463, the preferential response addressee, which is the head of the re-response method definition information 4k, is stored in the variable "direct". At step S464 a check is performed to determine whether or not the variable "direct" is valid. When the variable "direct" is valid, program control goes to step S465. When the variable "direct" is invalid, the processing is terminated as "no reply". That is, when all the response methods defined in the re-response definition information 4k are attempted, and when all the response methods fail, no further response attempt is made, and it is assumed that a re-response is impossible.

At step S465, the head of a valid, available medium, which corresponds to the variable "direct" in the re-response definition information 4k, is stored in the variable "medium", and the processing is terminated as "reply".

An explanation will now be given for the re-response selection process when a response with an addressee="assistant" and employed medium="mail" fails. The response method definition information 4g, obtained immediately after the re-response method selection process is initiated, is initialized as a valid value, as is shown in FIG. 24. When the process at step S461 is performed, of the re-response method definition information items 4k, an addressee for the current response and the employed medium are invalidated (FIG. 48). Since the definition for the preferential addressee="assistant" in the re-response method definition information 4k is still valid, the variable "direct" is not changed and retains "assistant", and "pager", the valid and available medium, which is the head and corresponds to the preferential addressee="assistant" in the re-response method definition information 4k, is stored in the variable "medium". The processing is thereafter terminated as "reply".

Further, when the re-response and its failure are repeated and all the usable media for the preferential addressee="assistant" are invalidated, the preferential addressee="assistant" is also invalidated. Thus, "user", the valid preferential addressee, which is the head of the re-response method definition information, is stored in the variable "medium", and "mail", which is a corresponding usable medium, is stored in the variable "medium", and the processing is terminated as "reply".

In addition, when the re-response and its failure are repeated and all the combinations of the most preferential addressees and usable media are invalidated, no more combinations for a re-response are found. The processing is then terminated as "no reply".

Since, in this example, no definition for the variable "contents" is provided in the re-response method definition information 4k, the value at the time of activation is returned unchanged.

According to the above described embodiment, whether or not a problem can be resolved as the result of a response is evaluated. Therefore, even if a user does not notice the response or can not take action to cope with the response, a response is retransmitted by another method, so that the problem can be resolved.

Fifth Embodiment

Operating features of the fifth embodiment are that, after the transmission of a response, a status to the effect that a user has or has not confirmed the response is acquired, and that even when a user does not notice the response or can take no action to cope with the response, the response is retransmitted using another method.

<Example Arrangement of System>

Figure 49:
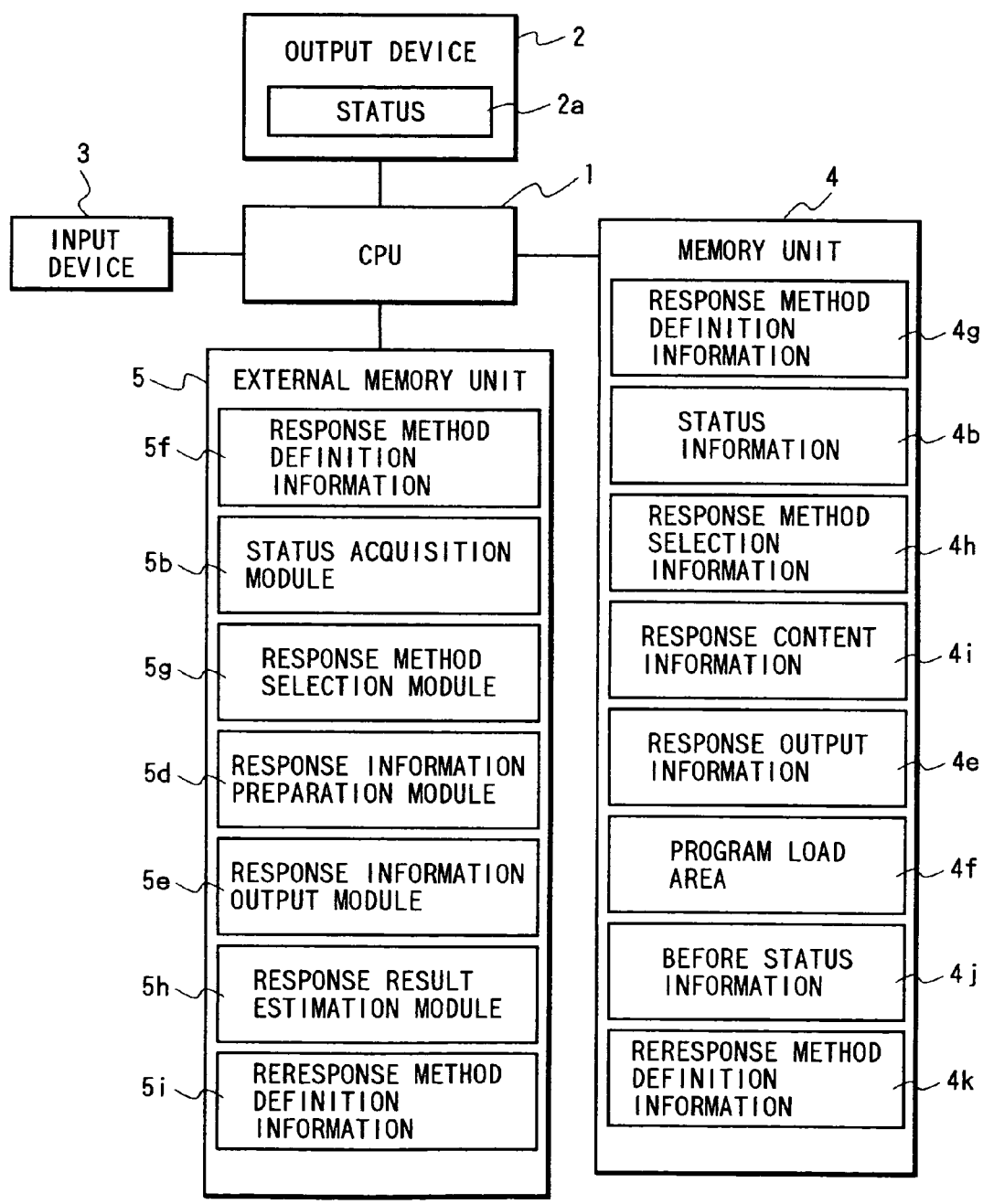
FIG. 49 is a block diagram illustrating an example hardware arrangement for an information processing system according to a fifth embodiment of the present invention.

FIG. 49 is a block diagram illustrating an example hardware arrangement for an information processing apparatus according to a fifth embodiment. The arrangement in FIG. 49 is substantially the same as that in FIG. 6, 21, 34 or 40, and only one part of the contents of a memory unit 4 and an external memory unit 5 are different. Since there are no new portions in FIG. 49 that are not shown in FIG. 40, no explanation for the individual sections will be given. Specifically, the procedures for a response result evaluation module 5k in the external memory unit 5 differs from that in FIG. 40, and will be described later.

<Processing Configuration>

Figure 50:
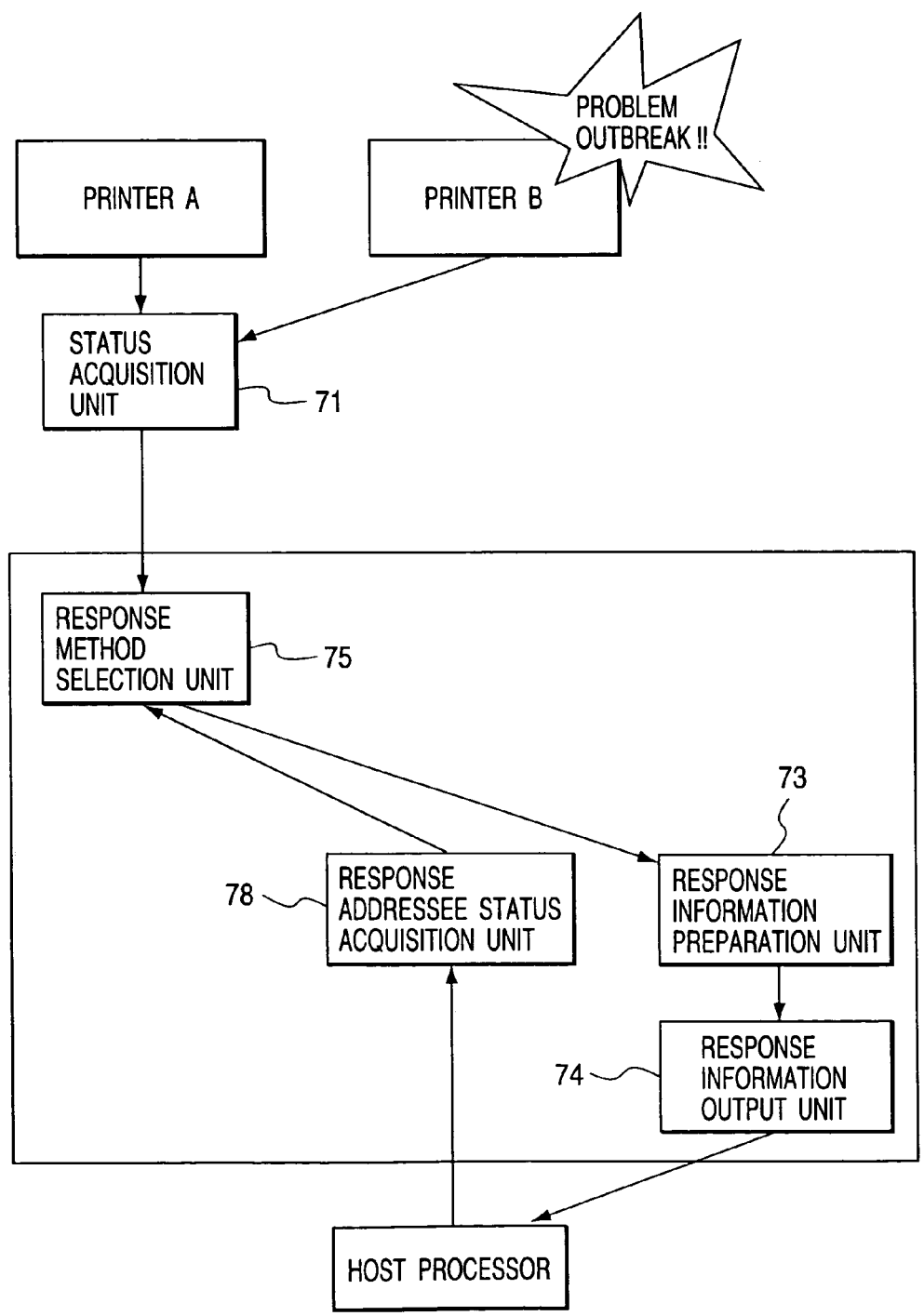
FIG. 50 is a diagram illustrating an example processing structure according to the fifth embodiment.

FIG. 50 is a diagram showing an example processing configuration according to the fifth embodiment. The difference from the configuration in FIG. 41 is that a response addressee status acquisition unit 78 acquires a status and determines whether or not a user has confirmed a response, and employs the result to determine whether or not a re-response should be transmitted. That is, when the response is confirmed, a processing sequence is terminated. When the response is not confirmed, a re-response is transmitted.

The processing in the fifth embodiment, mainly the processing performed by the response addressee status acquisition unit 78, will now be described in detail.

First, since the overall processing for the fifth embodiment is substantially the same as that for the fourth embodiment, the flowchart in FIG. 42 is referred to for the explanation. The processing performed at step S433 for the fifth embodiment differs from that for the fourth embodiment. At step S433 a status indicating whether or not an addressee user has confirmed the response is acquired in order to determine whether the user did not notice the response or could not take any actions to cope with the response. When the user does not notice the response or can not cope with the response, it is assumed that the response fails, and program control moves to step S435. Since in all the other cases the processing is performed in the same manner as for the fourth embodiment, no further explanation will be given.

In FIG. 50, since the processes, including the re-response method selection process, performed by a status acquisition unit 71, a response information preparation unit 73, a response information output unit 74 and a response method selection unit 75 are the same as those in the fourth embodiment, no explanation for them will be given.

<Response Addressee Status Acquisition Unit 78>

Figure 51:
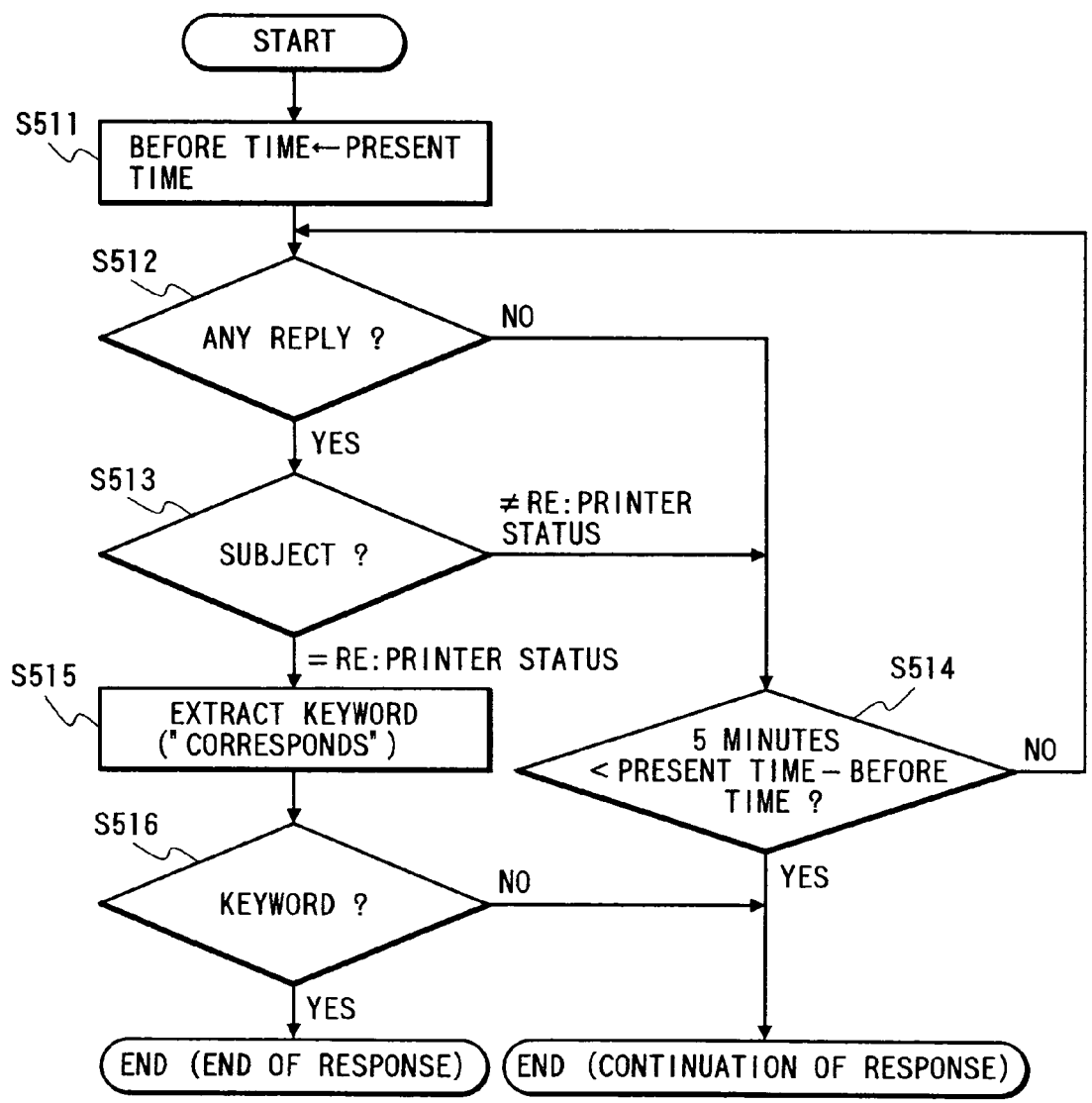
FIG. 51 is a flowchart of the overall processing performed by a response addressee status acquisition unit according to the fifth embodiment.

FIG. 51 is a flowchart of the processing for the response addressee status acquisition unit 78 according to the fifth embodiment.

Figure 52:
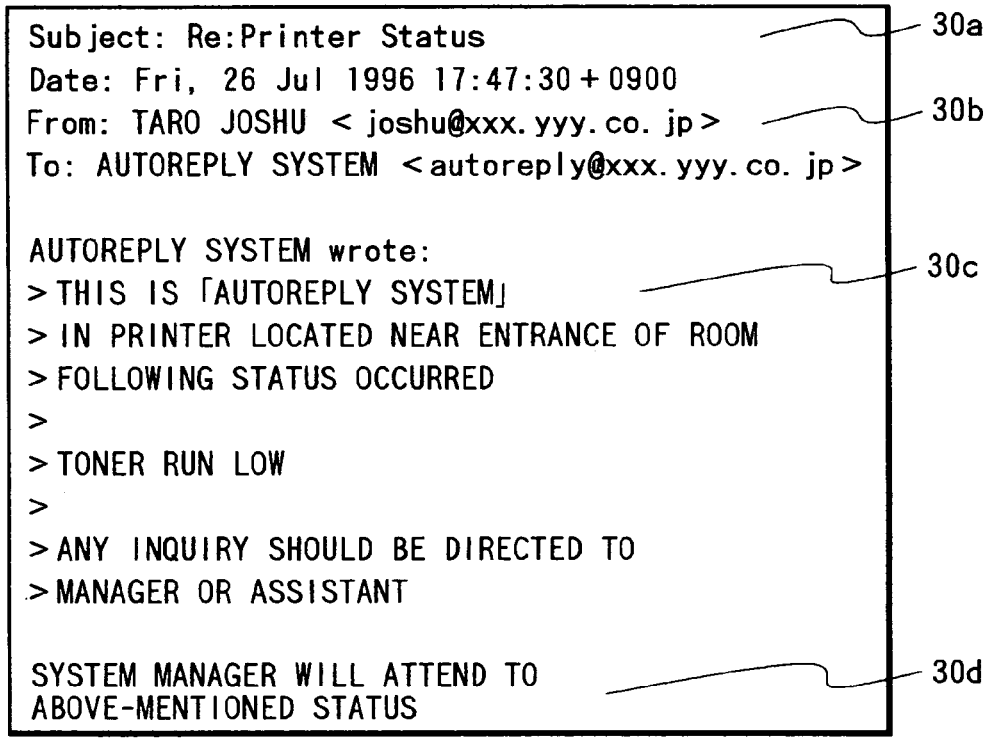
FIG. 52 is a diagram illustrating an example of received mail that is to be evaluated by the response addressee status acquisition unit in the fifth embodiment.

FIG. 52 is a diagram illustrating an example of received mail that is to be evaluated by the response addressee status acquisition unit 78.

When the response addressee status acquisition unit 78 is activated, first, at step S511 the current time is stored in the variable "BeforeTime". At step S512 a check is performed to determine whether mail has been transmitted by a user. When mail is received from a user, program control advances to step S513. When no mail is received, program control goes to step S514.

At step S513 whether or not the received mail is an evaluation object for the response addressee status acquisition unit 78 is determined by referring to Subject 30a of the received mail. In this flowchart, a check is performed merely to determine whether a character string following Subject: is the same as "Re:Printer Status". When the character string matches, the received mail is determined to be an evaluation object, and program control moves to step S515. When the character strings do not match, the received mail is determined to be mail other than an evaluation object, and program control goes to step S514.

At step S514 the time stored in variable "BeforeTime" is compared with the current time to determine whether or not a predetermined period of time has elapsed following a response. When a predetermined time has elapsed, "continuation of response" is determined, and the processing is terminated. When a predetermined time has not yet elapsed, program control returns to step S512 to repeat the check.

At step S515 the received mail is examined for a Keyword ("will attend"). If the Keyword is found, at step S516 "end of response" is determined, and the processing is terminated. When no Keyword is found, "continuation of response" is determined, and the processing is terminated.

An explanation will now be given for a case where mail shown in FIG. 25 is transmitted in response to mail shown in FIG. 33 that is output by the response information output unit 74. Assuming that the time the response information output unit 74 output mail is 17:45:15, at step S511 the time is stored in the variable "BeforeTime". Since at step S512 there is a response, program control moves to step S513 whereat the portion "Subject" is referred to. As a result, since "Subject" is equal to Re:Printer Status", program control advances to step S515. As a result of the extraction of a Keyword at step S515, it is present in a portion 30d in FIG. 52. At step S516, therefore, it is ascertained that a Keyword exists, and the processing is terminated as "end of response".

In addition, an explanation will be given for a case where mail is not transmitted from a user relative to the above described response. At step S512, it is ascertained that no reply has been received. Program control moves to step S514, whereat how much time has elapsed since the response was output is determined. That is, whether or not a predetermined time, e.g., five minutes in this embodiment, has elapsed is determined. When five minutes have elapsed, program control returns to step S512, whereat whether or not mail has been received is determined. When five minutes or longer has elapsed, it is assumed that a user did not notice a response or was not prepared to handle the response, and the processing is terminated as "continuation of response".

For a case where mail "Will not attend", which differs from mail in FIG. 52, is transmitted, since no Keyword is present, the processing is also terminated as "continuation of response".

[Modification of Fifth Embodiment]

In the fifth embodiment, a status indicating whether an addressee user has confirmed a response is examined. Before a response is transmitted, a status indicating whether or not an addressee user can confirm a response and handle it may be acquired in order to avoid wasteful response transmission and to take an effective countermeasure.

According to the above described embodiment, whether or not a problem is resolved as a result of a response is determined. Therefore, even when a user did not notice a response or can not take an action to cope with the response, the response is retransmitted by another method, so that a problem can be resolved.

In the above embodiment, a reply from an addressee user is confirmed before the retransmission of a response, and a status as to whether or not the user can handle the response is acquired. Therefore, the wasteful transmission of a response can be avoided and an effective countermeasure can be taken.

The present invention can be applied either for a system that is constructed by a plurality of apparatuses (e.g., a host computer, an interface device, a reader and a printer) or for an apparatus including a single device.

The following is also included within the scope of the present invention: in order to operate various devices to implement functions in the above embodiments, software program code for implementing the functions in the previous embodiments are supplied to a computer in an apparatus or in a system that is connected to various devices, and in consonance with the program, the computer in the system or the apparatus operates the devices to accomplish the functions in the above embodiments. In this case, the program code read from a memory medium accomplishes the functions of the above described embodiments. And the program code and means for supplying the program code to the computer, e.g., a memory medium on which such program code is recorded, constitute the present invention.

A memory medium for supplying such program code can be, for example, a floppy disk, a hard disk, an optical disk, a magneto optical disk, a CD-ROM, a CD-R, a magnetic tape, a nonvolatile memory card, or a ROM.

In addition, not only for a case where the functions in the previous embodiments can be performed when program code is read and executed by the computer, but also for a case where, according to an instruction in the program code, an OS (Operating System) running on the computer, or another application software program, interacts with the program code to accomplish the functions in the above embodiments, this program code can be included in the embodiments of the present invention.

Furthermore, the present invention includes a case where program code, read from a memory medium, is written in a memory that is mounted on a function expansion board inserted into a computer, or in a function expansion unit connected to a computer, and in consonance with a program code instruction, a CPU mounted on the function expansion board or the function expansion unit performs one part, or all of the actual processing in order to implement the functions in the above described embodiments.

When the present invention is applied for the above memory medium, program code corresponding to the previously described flowcharts is stored in the memory medium. In short, the individual modules in the system arrangement diagram in, for example, FIG. 6, is stored in a memory medium. That is, program code for a status acquisition module, a response content selection module, a response information preparation module, a response information output module and an input/output control module need to be stored in a memory medium.

Although the present invention has been described in its preferred form with a certain degree of particularity, many apparently widely different embodiments of the invention can be devised without departing from the spirit and the scope thereof. It is to be understood that the invention is not limited to the specific embodiments thereof except as defined in the appended claims.

What is claimed is:

1. A response apparatus comprising:
    status acquisition means for acquiring a status of a machine to be checked;
    discrimination means for discriminating a type of an error indicated by the acquired status;
    response addressee selection means for selecting a response addressee depending upon the discriminated type of the error;
    response medium selection means for selecting a response medium based on the discriminated type of the error;
    response message selection means for selecting a response message in accordance with the discriminated type of the error;
    phrase selection means for selecting an opening or closing phrase in accordance with the selected response medium;
    response text preparation means for preparing a response text by appending the selected opening or closing phrase to the selected response message; and
    response text output means for outputting the prepared response text to the selected response addressee using the selected response medium.

2. A response apparatus according to claim 1, wherein said response text preparation means prepares said response text in a form corresponding to a medium at a response addressee.

3. A response apparatus according to claim 1, further comprising definition information storage means for storing definition information that defines a response message for a status, wherein said response message selection means selecting a response content by referring to said definition information storage means.

4. A response apparatus according to claim 1, wherein said status acquired by said status acquisition means indicates there are a plurality of statuses that occur at the same time.

5. A response apparatus according to claim 1, wherein said response text preparation means includes response content information preparation data storage means for storing fixed information for each portion of a text that is prepared, and employs said fixed information to prepare a response text.

6. A response apparatus according to claim 1, wherein said response text preparation means includes response content preparation rule storage means for storing a response content preparation rule, and employs said response content preparation rule to prepare a response content.

7. A response apparatus according to claim 1, wherein said response text preparation means includes:
    text preparation means for preparing text that serves as part of said response text; and
    additional sentence preparation means for preparing the opening or closing phrase.

8. A response apparatus according to claim 1, wherein said response text output means transmits said response text using electronic mail.

9. A response apparatus according to claim 8, wherein said response text output means includes addition means for adding an electronic mail header or an electronic mail footer to the response text prepared by said response text preparation means.

10. A-response apparatus according to claim 1, wherein said response text output means outputs the response text to a telephone.

11. A response apparatus according to claim 10, wherein the telephone is a portable telephone.

12. A response apparatus according to claim 10, wherein said response text output means transmits the response text to a management system.

13. A response apparatus according to claim 12, wherein the management system is a database management system.

14. A response apparatus according to claim 12, wherein the management system is a file management system.

15. A response apparatus according to claim 1, wherein said response text output means transmits the response text using a home page.

16. A response apparatus according to claim 1, wherein said response text output means outputs the response text using sound.

17. A response apparatus according to claim 1, wherein said response text output means outputs the response text to a pocket bell.

18. A response apparatus according to claim 1, wherein said response text output means outputs the response text to a facsimile machine.

19. A response apparatus according to claim 1, wherein said response procedure selection means selects a response procedure from a plurality of available response procedures.

20. A response apparatus according to claim 19, wherein said response procedure selection means selects a response procedure in consonance with the degree of importance of said status.

21. A response apparatus according to claim 1, wherein said response procedure selection means selects whether or not a response is to be transmitted.

22. A response apparatus according to claim 1, wherein said response procedure selection means designates a response timing.

23. A response apparatus according to claim 1, wherein said response procedure selection means designates a language type.

24. A response apparatus according to claim 1, wherein said response procedure selection means selects the degree of detail in an explanation.

25. A response apparatus according to claim 1, wherein said response procedure selection means determines a condition for transmission of a response.

26. A response apparatus according to claim 1, wherein said response procedure selection means selects a re-response procedure.

27. A response apparatus according to claim 1, wherein said response procedure selection means selects the number of re-responses.

28. A response apparatus according to claim 1, further comprising definition information storage means for storing definition information that defines a response procedure for a status, wherein said response procedure selection means selects a response procedure by referring to said definition information storage means.

29. A response apparatus according to claim 28, wherein status data in said definition information indicate a single status.

30. A response apparatus according to claim 28, wherein status data in said definition information also include a combination composed of a plurality of statuses.

31. A response apparatus according to claim 28, wherein status data in said definition information also include a status that changes as time elapses.

32. A response apparatus according to claim 28, wherein statuses in said definition information also include a plurality of statuses that occur at the same time.

33. A response apparatus according to claim 1, further comprising response procedure designation means for designating a response procedure for each status, wherein, in consonance with said acquired status, said response procedure selection means selects a response procedure designated by said response procedure designation means.

34. A response method comprising the steps of:
acquiring a status of a machine to be checked;
discriminating a type of an error indicated by the acquired status;
selecting a response addressee depending upon the discriminated type of the error;
selecting a response medium based on the discriminated type of the error;
selecting a response message in accordance with the discriminated type of the error;
selecting an opening or closing phrase in accordance with the selected response medium;
preparing a response text by appending the selected opening or closing phrase to the selected response message; and
outputting the prepared response text to the selected response addressee using the selected response medium.

35. A response method according to claim 34, wherein, in said response information preparation step, the response information is prepared in a form corresponding to a medium at a response addressee.

36. A response method according to claim 34, further comprising the step of storing definition information that defines a response content for a status, wherein, in said response content selection step, a response content is selected by referring to the definition information.

37. A response method according to claim 34, wherein the status acquired in said status acquisition step indicates there are a plurality of statuses that occur at the same time.

38. A response method according to claim 34, wherein, in response content preparation step, response content information preparation data storage means is referred to in which is stored fixed information for each portion of a content that is prepared, and the fixed information is employed to prepare a response content.

39. A response method according to claim 34, wherein, in said response content preparation step, response content preparation rule storage means is referred to in which is stored a response content preparation rule, and the response content preparation rule is employed to prepare a response content.

40. A response method according to claim 34, wherein said response information preparation step includes:
a text preparation step, of preparing text of the response information; and
an additional sentence preparation step, of preparing the opening or closing phrase.

41. A response method according to claim 34, wherein, in said response information output step, the response information is transmitted using electronic mail.

42. A response method according to claim 41, wherein said response information output step includes an addition step, of adding an electronic mail header or an electronic mail footer to response information prepared in said response information preparation step.

43. A response method according to claim 34, wherein, in said response information output step, response information is output to a telephone.

44. A response method according to claim 43, wherein the telephone is a portable telephone.

45. A response method according to claim 34, wherein, in said response information output step, response information is transmitted to a management system.

46. A response method according to claim 45, wherein the management system is a database management system.

47. A response method according to claim 45, wherein the management system is a file management system.

48. A response method according to claim 34, wherein, in said response information output step, response information is transmitted using a home page.

49. A response method according to claim 34, wherein, in said response information output step, response information is output using sound.

50. A response method according to claim 34, wherein, in said response information output step, response information is output to a pocket bell.

51. A response method according to claim 34, wherein, in said response information output step, response information is output to a facsimile machine.

52. A response method according to claim 34, wherein, in said response procedure selection step, a response procedure is selected from a plurality of available response procedures.

53. A response method according to claim 34, wherein, in said response procedure selection step, a response procedure is selected in consonance with the degree of importance of the status.

54. A response method according to claim 34, wherein, in said response procedure selection step, whether or not a response is to be transmitted is determined.

55. A response method according to claim 34, wherein, in said response procedure selection step, a response content is designated.

56. A response method according to claim 34, wherein, in said response procedure selection step, a response medium is designated.

57. A response method according to claim 34, wherein, in said response procedure selection step, a response timing is designated.

58. A response method according to claim 34, wherein, in said response procedure step, a language type is designated.

59. A response method according to claim 34, wherein, in said response procedure selection step, the degree of detail in an explanation is determined.

60. A response method according to claim 34, wherein, in said response procedure selection step, a condition for transmission of a response is selected.

61. A response method according to claim 34, wherein, in said response procedure selection step, a re-response procedure is determined selected.

62. A response method according to claim 61, wherein, in said response procedure selection step, the number of re-responses is determined.

63. A response method according to claim 34, further comprising a definition information storage step, of storing definition information that defines a response procedure for a status, wherein, in said response procedure selection step, a response procedure is selected by referring to said definition information storage step.

64. A response method according to claim 63, wherein status data in the definition information indicate a single status.

65. A response method according to claim 63, wherein status data in the definition information also include a combination composed of a plurality of statuses.

66. A response method according to claim 63, wherein status data in the definition information also include a status that changes as time elapses.

67. A response method according to claim 63, wherein statuses in the definition information also include a plurality of statuses that occur at the same time.

68. A response method according to claim 34, further comprising a response procedure designation step, of designating a response procedure for each status, wherein, in consonance with the acquired status, in said response procedure selection step, a response procedure is selected that has been designated in said response procedure designation step.

69. A computer-readable storage medium in which is stored a response program for controlling a computer to transmit a response, said program comprising codes for enabling said computer to perform the steps of:
    acquiring a status of a machine to be checked;
    discriminating a type of an error indicated by the acquired status;
    selecting a response addressee depending upon the discriminated type of the error;
    selecting a response medium based on the discriminated type of the error;
    selecting a response message in accordance with the discriminated type of the error;
    selecting an opening or closing phrase in accordance with the selected response medium;
    preparing response text by appending the selected opening or closing phrase to the selected response message in a text form corresponding to the selected response medium; and
    outputting the prepared response text to the selected response addressee in accordance with the selected response procedure.

* * * * *

UNITED STATES PATENT AND TRADEMARK OFFICE
CERTIFICATE OF CORRECTION

PATENT NO. : 6,989,907 B1
APPLICATION NO. : 08/988959
DATED : January 24, 2006
INVENTOR(S) : Suresh Jeyachandran It is certified that error appears in the above-identified patent and that said Letters Patent is hereby corrected as shown below:

COLUMN 13:
Line 24, "phase," should read -- phrase, --.

COLUMN 16:
Line 29, ""minutes" should read -- minutes --.

COLUMN 20:
Line 32, "to the" should read -- the --.

COLUMN 22:
Line 46, "preforms" should read -- performs --.

COLUMN 28:
Line 44, "Re:Printer" should read -- "Re: Printer --.

COLUMN 29:
Line 64, "is" should read -- are --.

COLUMN 30:
Line 41, "selecting" should read -- selects --.

COLUMN 31:
Line 6, "A-response" should read -- A response --.

COLUMN 32:
Line 46, "in" should read -- in said --.

UNITED STATES PATENT AND TRADEMARK OFFICE
CERTIFICATE OF CORRECTION

PATENT NO. : 6,989,907 B1
APPLICATION NO. : 08/988959
DATED : January 24, 2006
INVENTOR(S) : Suresh Jeyachandran It is certified that error appears in the above-identified patent and that said Letters Patent is hereby corrected as shown below:

COLUMN 34:
Line 3, "determined" should be deleted.

Signed and Sealed this

Sixth Day of February, 2007

JON W. DUDAS
*Director of the United States Patent and Trademark Office*